United States Patent
Bouazizi et al.

(10) Patent No.: US 12,035,020 B2
(45) Date of Patent: Jul. 9, 2024

(54) SPLIT RENDERING OF EXTENDED REALITY DATA OVER 5G NETWORKS

(71) Applicant: QUALCOMM Incorporated, San Diego, CA (US)

(72) Inventors: Imed Bouazizi, Frisco, TX (US); Thomas Stockhammer, Bergen (DE); Nikolai Konrad Leung, San Francisco, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 246 days.

(21) Appl. No.: 17/742,168

(22) Filed: May 11, 2022

(65) Prior Publication Data

US 2022/0369000 A1   Nov. 17, 2022

Related U.S. Application Data

(60) Provisional application No. 63/187,840, filed on May 12, 2021.

(51) Int. Cl.
  *H04N 21/81*   (2011.01)
  *G06T 11/00*   (2006.01)
  (Continued)

(52) U.S. Cl.
  CPC ........... *H04N 21/816* (2013.01); *G06T 11/00* (2013.01); *G06T 19/006* (2013.01); *H04N 19/20* (2014.11);
  (Continued)

(58) Field of Classification Search
  CPC .... H04N 21/816; H04N 19/20; H04N 21/435; H04N 21/8455; H04N 21/23418;
  (Continued)

(56) References Cited

U.S. PATENT DOCUMENTS 9,616,338 B1   4/2017   Hooper et al.
10,165,577 B2*  12/2018  Shaw .................. H04L 41/5003
(Continued)

FOREIGN PATENT DOCUMENTS

WO   2019190722 A1   10/2019
WO   2020139766 A2    7/2020

OTHER PUBLICATIONS

3GPP TR 26.803: "3rd Generation Partnership Project, Technical Specification Group Services and System Aspects, Study on 5G Media Streaming Extensions for Edge Processing (Release 17)", 3GPP TR 26.803 V17.0.0, Jun. 2021, pp. 1-64.

(Continued)

*Primary Examiner* — Ryan R Yang
(74) *Attorney, Agent, or Firm* — Shumaker & Sieffert, P.A.

(57) ABSTRACT

An example device for processing extended reality (XR) data includes a processors configured to: parse entry point data of an XR scene to extract information about one or more required virtual objects for the XR scene, the required virtual objects including a number of dynamic virtual objects equal to or greater than one, each of the dynamic virtual objects including at least one dynamic media component for which media data is to be retrieved; initialize a number of streaming sessions equal to or greater than the number of dynamic virtual objects using the entry point data; configure quality of service (QoS) and charging information for the streaming sessions; retrieve media data for the dynamic virtual objects via the streaming sessions; and send the retrieved media data to a rendering unit to render the XR scene to include the retrieved media data at corresponding locations within the XR scene.

29 Claims, 7 Drawing Sheets

(51) Int. Cl.
*G06T 19/00* (2011.01)
*H04N 19/20* (2014.01)
*H04N 21/435* (2011.01)
*H04N 21/845* (2011.01)
*H04S 7/00* (2006.01)

(52) U.S. Cl.
CPC ....... *H04N 21/435* (2013.01); *H04N 21/8455* (2013.01); *H04S 7/30* (2013.01); *H04S 2400/11* (2013.01)

(58) Field of Classification Search
CPC ........ H04N 21/44209; H04N 21/26258; G06T 11/00; G06T 19/006; H04S 7/30; H04S 2400/11; H04S 7/302
See application file for complete search history.

(56) References Cited

U.S. PATENT DOCUMENTS 11,184,683 B2* 11/2021 Denoual ............ H04N 21/6125
2020/0366962 A1 11/2020 Lim
2021/0099773 A1 4/2021 Bouazizi et al.

OTHER PUBLICATIONS

3GPP TR 26.998: "3rd Generation Partnership Project, Technical Specification Group SA, Support of 5G Glass-type Augmented Reality / Mixed Reality (AR/MR) Devices, (Release 17)", 3GPP TR 26.998 V1.1.0, Nov. 2021, pp. 1-118.
3GPP TR 26.998: "3rd Generation Partnership Project, Technical Specification Group SA WG4, Support of 5G Glass-type Augmented Reality / Mixed Reality (AR/MR) Devices, (Release 17)", 3GPP TR 26.998 V0.7.0, Apr. 2021, pp. 32-76.
3GPP: "5G, Extended Reality (XR) in 5G (3GPP TR 26.928 version 16.1.0 Release 16)", ETSI Technical Report, European Telecommunications Standards Institute (ETSI), 650, Route Des Lucioles, F-06921 Sophia-Antipolis Cedex, France, vol. 3GPP SA, No. V16.1.0, Jan. 19, 2021 (Jan. 19, 2021), pp. 1-133, XP014390401, Retrieved from the Internet: URL: http://www.etsi.org/deliver/etsi_tr/126900_126999/126928/16.01.00_60/tr_126928v160100p.pdf, [retrieved on Jan. 19, 2021], p. 25.
"3rd Generation Partnership Project, Technical Specification Group SA, Support of SG Glass-type Augmented Reality/Mixed Reality (AR/MR) devices, (Release 17)", 3GPP TR 26.998, V1.0.4, 3GPP Draft, S4-211344, 3rd Generation Partnership Project (3GPP), Mobile Competence Centre, 650, Route Des Lucioles, F-06921 Sophia-Antipolis Cedex, France, Oct. 27, 2021 (Oct. 27, 2021), 93 Pages, XP052071008, Retrieved from the Internet: URL: https://ftp.3gpp.org/tsg_sa/WG4_CODEC/TSGS4_116-e/Docs/S4-211344.zip, S4-211344.doc [retrieved on Oct. 27, 2021].
Fielding R., et al., "Hypertext Transfer Protocol—HTTP/1.1", Network Working Group, Request for Comments, RFC 2616, Standards Track, Jun. 1999, pp. 1-114.
International Search Report and Written Opinion—PCT/US2022/028995—ISA/EPO—Jul. 25, 2022, 19 pp.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
MPEG Systems: "Technologies under Consideration on Scene Description for MPEG Media", 134. MPEG Meeting, Apr. 26, 2010-Apr. 30, 2021, Online, (Motion Picture Expert Group or ISO/IEC JTC1/SC29/WG11), No. n20270, May 7, 2021 (May 7, 2021), 56 Pages, XP030294563, Retrieved from the Internet: URL: https://dms.mpeg.expert/doc_end_user/documents/134_OnLine/wg11/MDS20270_WG03_N00208.zip, WG3N00208/MDS20270_N0208_track.docx [retrieved on May 7, 2021] p. 42-p. 48.
Samsung Electronics Co., et al., "[FS_5GSTAR] Permanent Document", 3GPP Draft, S4AV210677, 3rd Generation Partnership Project (3GPP), Mobile Competence Centre, 650, Route Des Lucioles, F-06921 Sophia-Antipolis Cedex, France, vol. TSG SA, No. Electronics, May 4, 2021, May 3, 2021 (May 3, 2021), 43 Pages, XP052012174, Retrieved from the Internet: URL: https://www.3gpp.org/ftp/tsg_sa/WG4_CODEC/3GPP_SA4_AHOC_MTGs/SA4_VIDEO/Docs/S4aV210677.zip, S4aV210677.doc.
"Text of ISO/IEC DIS 23090-14 Scene Description for MPEG Media", 134. MPEG Meeting, Apr. 26, 2021-Apr. 30, 2021, Online, (Motion Picture Expert Group or ISO/IEC JTC1/SC29/WG11), No. n20326, May 7, 2021 (May 7, 2021), 71 Pages, XP030294613, Retrieved from the Internet: URL: https://dms.mpeg.expert/doc_end_user/documents/134_OnLine/wg11/MDS20326_WG03_N0026.zip, 23090-14/MDS20326_N0264_DIS_final_track.docx [retrieved on May 7, 2021].
Thomas E., et al., "MPEG Media Enablers for Richer XR Experiences", arxiv.org, Cornell University Library, 201 Olin Library Cornell University Ithaca, NY 14853, Oct. 9, 2020 (Oct. 9, 2020), 12 Pages, XP081782510, p. 4, figure 4 scene description, p. 7-p. 10.

* cited by examiner

SPLIT RENDERING OF EXTENDED REALITY DATA OVER 5G NETWORKS

This application claims the benefit of U.S. Provisional Application No. 63/187,840, filed May 12, 2021, the entire contents of which are hereby incorporated by reference.

TECHNICAL FIELD

This disclosure relates to storage and transport of media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After video data and other media data have been encoded, the media data may be packetized for transmission or storage. The media data may be assembled into a video file conforming to any of a variety of standards, such as the International Organization for Standardization (ISO) base media file format and extensions thereof.

SUMMARY

In general, this disclosure describes techniques related to processing extended reality (XR) data, e.g., using split rendering. In particular, the techniques of this disclosure are directed to processing media data including a number of dynamic virtual objects. A client device may be configured to initialize respective streaming sessions for each of the dynamic virtual objects. That is, there may be a one-to-one correspondence between the streaming sessions and the dynamic virtual objects. In this manner, media data for each of the dynamic streaming sessions may be streamed via a respective one of the streaming session. Each of the streaming sessions may have individual quality of service (QoS) and charging information configured according to, e.g., a type for the corresponding dynamic virtual object.

In one example, a method of processing extended reality (XR) data includes parsing entry point data of an XR scene to extract information about one or more required virtual objects for the XR scene, the one or more required virtual objects including a number of dynamic virtual objects equal to or greater than one, each of the dynamic virtual objects including at least one dynamic media component for which media data is to be retrieved; initializing a number of streaming sessions equal to the number of dynamic virtual objects using the entry point data, wherein initializing the streaming sessions includes initializing the streaming sessions in compliance with configured quality of service (QoS) and charging information for the streaming sessions; retrieving media data for each of the dynamic media components of the dynamic virtual objects via one of the respective number of streaming sessions; and sending the retrieved media data to a rendering unit to render the XR scene to include the retrieved media data at corresponding locations within the XR scene.

In another example, a device for processing extended reality (XR) data includes a memory configured to store XR data and media data; and one or more processors implemented in circuitry and configured to: parse entry point data of an XR scene to extract information about one or more required virtual objects for the XR scene, the one or more required virtual objects including a number of dynamic virtual objects equal to or greater than one, each of the dynamic virtual objects including at least one dynamic media component for which media data is to be retrieved; initialize a number of streaming sessions equal to the number of dynamic virtual objects using the entry point data, wherein to initialize the streaming sessions, the one or more processors are configured to initialize the streaming sessions in compliance with configured quality of service (QoS) and charging information for the streaming sessions; retrieve media data for each of the dynamic media components of the dynamic virtual objects via one of the respective number of streaming sessions; and send the retrieved media data to a rendering unit to render the XR scene to include the retrieved media data at corresponding locations within the XR scene.

In another example, a computer-readable storage medium has stored thereon instructions that, when executed, cause a processor to: parse entry point data of an XR scene to extract information about one or more required virtual objects for the XR scene, the one or more required virtual objects including a number of dynamic virtual objects equal to or greater than one, each of the dynamic virtual objects including at least one dynamic media component for which media data is to be retrieved; initialize a number of streaming sessions equal to the number of dynamic virtual objects using the entry point data, wherein the instructions that cause the processor to initialize the number of streaming sessions include instructions that cause the processor to initialize the streaming sessions in compliance with configured quality of service (QoS) and charging information for the streaming sessions; retrieve media data for each of the dynamic media components of the dynamic virtual objects via one of the respective number of streaming sessions; and send the retrieved media data to a rendering unit to render the XR scene to include the retrieved media data at corresponding locations within the XR scene.

In another example, a device for processing extended reality (XR) data includes means for parsing entry point data of an XR scene to extract information about one or more required virtual objects for the XR scene, the one or more required virtual objects including a number of dynamic virtual objects equal to or greater than one, each of the dynamic virtual objects including at least one dynamic media component for which media data is to be retrieved; means for initializing a number of streaming sessions equal to the number of dynamic virtual objects, wherein the means for initializing the number of streaming sessions includes means for initializing the streaming sessions in compliance with configured quality of service (QoS) and charging information for the streaming sessions; means for retrieving media data for each of the dynamic media components of the dynamic virtual objects via one of the respective number of streaming sessions; and means for sending the retrieved media data to a rendering unit to render the XR scene to include the retrieved media data at corresponding locations within the XR scene.

The details of one or more examples are set forth in the accompanying drawings and the description below. Other features, objects, and advantages will be apparent from the description and drawings, and from the claims.

DETAILED DESCRIPTION

Figure 1:
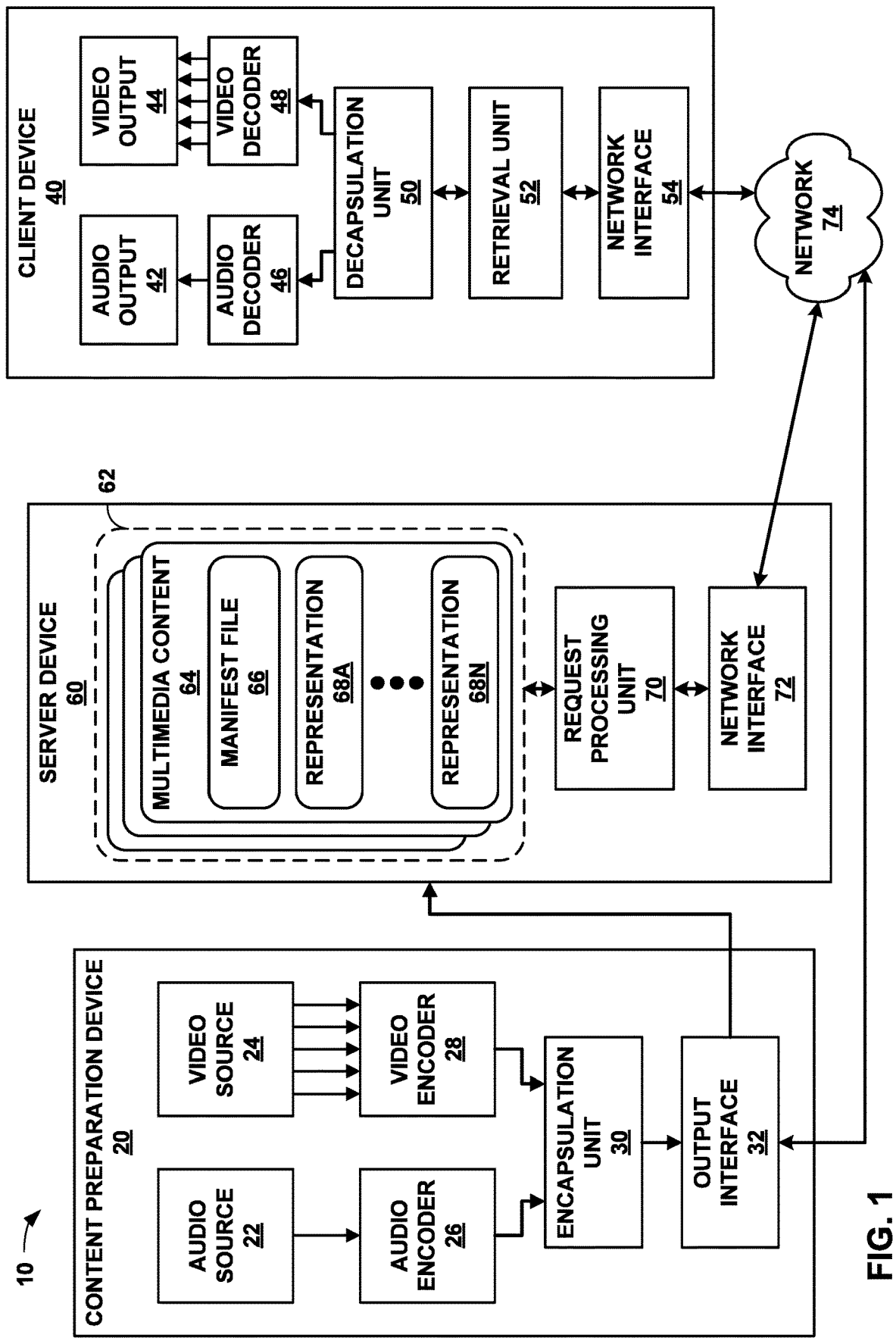
FIG. 1 is a block diagram illustrating an example system that implements techniques for streaming media data over a network.

OpenXR is an application programming interface (API) for developing extended reality (XR) applications that address a wide range of XR devices. XR refers to a mix of real and virtual world environments that are generated by computers through interactions by humans. XR includes technologies such as virtual reality (VR), augmented reality (AR), and mixed reality (MR). OpenXR is the interface between an application and an XR runtime. The XR runtime handles functionality such as frame composition, user-triggered actions, and tracking information.

OpenXR is designed to be a layered API, which means that a user or application may insert API layers between the application and the runtime implementation. These API layers provide additional functionality by intercepting OpenXR functions from the layer above and then performing different operations than would otherwise be performed without the layer. In the simplest cases, the layer simply calls the next layer down with the same arguments, but a more complex layer may implement API functionality that is not present in the layers or runtime below it. This mechanism is essentially an architected "function shimming" or "intercept" feature that is designed into OpenXR and meant to replace more informal methods of "hooking" API calls.

Applications can determine the API layers that are available to them by calling the xrEnumerateApiLayerProperties function to obtain a list of available API layers. Applications then can select the desired API layers from this list and provide them to the xrCreateInstance function when creating an instance.

API layers may implement OpenXR functions that may or may not be supported by the underlying runtime. In order to expose these new features, the API layer must expose this functionality in the form of an OpenXR extension. It must not expose new OpenXR functions without an associated extension.

An OpenXR instance is an object that allows an OpenXR application to communicate with an OpenXR runtime. The application accomplishes this communication by calling xrCreateInstance and receiving a handle to the resulting XrInstance object.

The XrInstance object stores and tracks OpenXR-related application state, without storing any such state in the application's global address space. This allows the application to create multiple instances as well as safely encapsulate the application's OpenXR state since this object is opaque to the application. OpenXR runtimes may limit the number of simultaneous XrInstance objects that may be created and used, but they must support the creation and usage of at least one XrInstance object per process.

Spaces are represented by XrSpace handles, which the application creates and then uses in API calls. Whenever an application calls a function that returns coordinates, it provides an XrSpace to specify the frame of reference in which those coordinates will be expressed. Similarly, when providing coordinates to a function, the application specifies which XrSpace the runtime should use to interpret those coordinates.

OpenXR defines a set of well-known reference spaces that applications use to bootstrap their spatial reasoning. These reference spaces are: VIEW, LOCAL and STAGE. Each reference space has a well-defined meaning, which establishes where its origin is positioned and how its axes are oriented.

Runtimes whose tracking systems improve their understanding of the world over time may track spaces independently. For example, even though a LOCAL space and a STAGE space each map their origin to a static position in the world, a runtime with an inside-out tracking system may introduce slight adjustments to the origin of each space on a continuous basis to keep each origin in place.

Beyond well-known reference spaces, runtimes expose other independently tracked spaces, such as a pose action space that tracks the pose of a motion controller over time.

In accordance with the techniques of this disclosure, XR data may be rendered in a split rendering fashion. That is, two or more devices may participate in rendering of the XR data, e.g., a client device and a server device. Multiple client and/or server devices may participate in an XR split rendering session. In general, a server may stream media data to the client using a streaming network protocol, such as Dynamic Adaptive Streaming over HTTP (DASH), HTTP Live Streaming (HLS), or the like.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Server device 60 and client device 40 may participate in an extended reality (XR) split rendering process as discussed in greater detail below. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
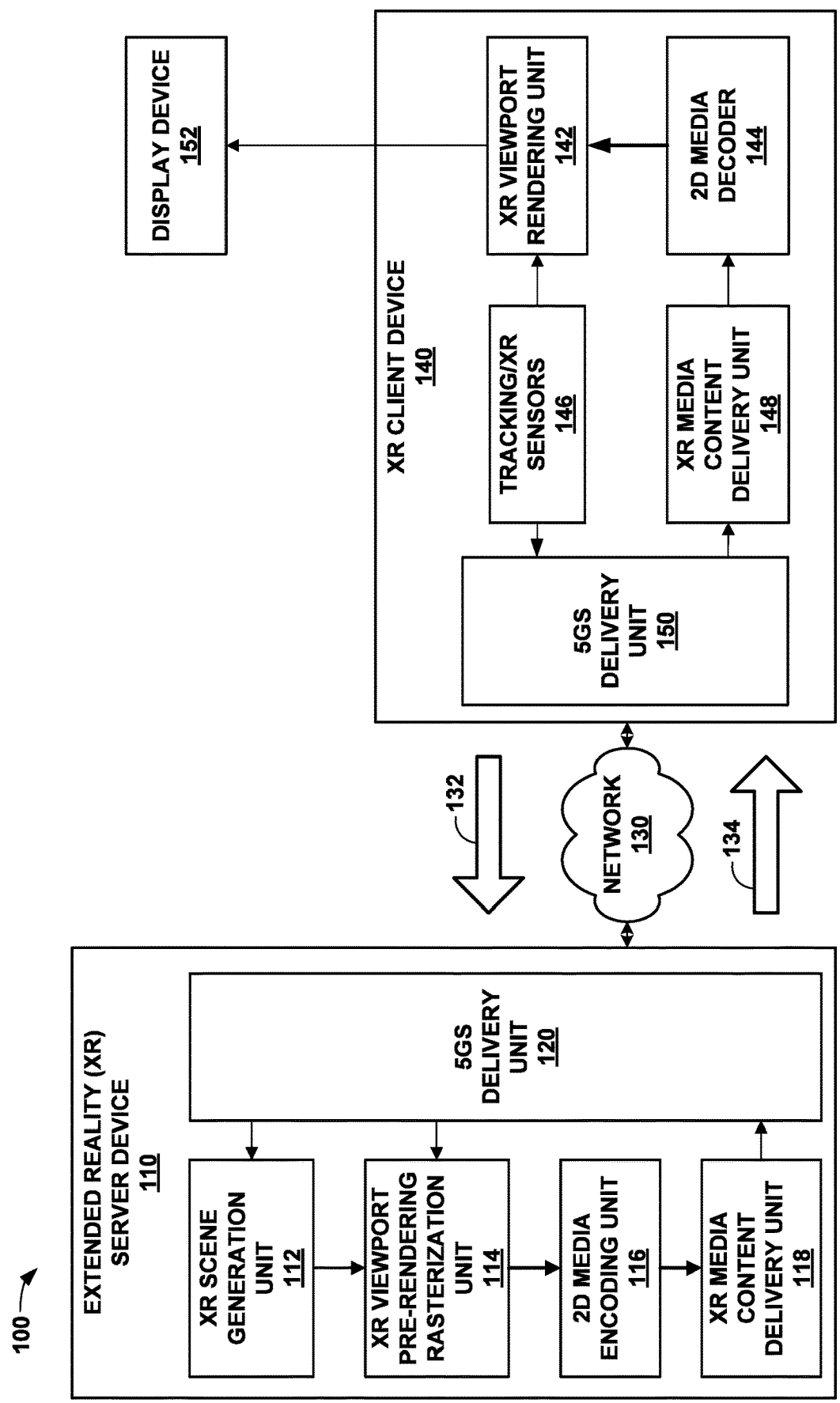
FIG. 2 is a block diagram illustrating an example computing system that may perform techniques of this disclosure.

In accordance with the techniques of this disclosure, client device 40 may be configured to perform either solo rendering or split rendering with a separate device. For example, video output 44 may be a separate device from client device 40 in some examples, e.g., as shown in FIG. 2. In general, client device 40, according to the techniques of this disclosure, may be configured to render extended reality (XR) data. In particular, the XR data may correspond to a scene including an XR scene. The XR scene may include one or more required virtual objects, which may include dynamic virtual objects. The dynamic virtual objects may generally be animated objects that can move as the XR scene is presented to a user. For example, a dynamic virtual object may include a coach or another student in an augmented reality (AR) use case for a virtual gym. A dynamic virtual object may be represented by a dynamic mesh, animated mesh or point cloud. A dynamic virtual object may include one or more dynamic media components (e.g., texture for a three-dimensional virtual object) and zero or more static components. For example, a geometric structure for the virtual object may be static, but the texture may be dynamic. Client device 40 may be configured to retrieve entry point data for a scene from, e.g., server device 60. The entry point data may include information about the required virtual objects including the dynamic virtual objects and the dynamic media components.

Using the entry point data, client device 40 may initialize a number of streaming sessions (e.g., with server device 60) equal to the number of dynamic virtual objects (or the number of dynamic media components for each of the dynamic virtual objects). That is, client device 40 may initialize a streaming session for each dynamic virtual object or each dynamic media component thereof. Thus, for example, if there are three dynamic virtual objects, client device 40 may initialize three streaming sessions, one for each of the dynamic virtual objects.

As part of initializing the streaming sessions, client device 40 may configure quality of service (QoS) and charging information for the streaming sessions. For example, QoS and charging information may be handled by a policy control function (PCF). Each of the dynamic virtual objects may conform to a particular type of object for which various streaming requirements are needed. Various types of objects may be associated with different QoS requirements. For example, dynamic virtual objects may be either two-dimensional (2D) or three-dimensional (3D) objects. In general, 3D objects may need a higher bitrate stream than 2D objects, because 3D objects require at least two distinct images (left and right eye images) in order to be properly displayed in 3D. Higher bitrates may also lead to higher costs for charging, due to higher bandwidth consumption.

As another example, media streams may have different amounts of bitrate and consume more bandwidth, e.g., due to a rendered size/resolution of the corresponding dynamic virtual object. Different qualities may be available for the dynamic virtual object. Thus, the QoS and charging information may vary based on a size of the dynamic virtual object and/or quality of the corresponding media stream.

In some cases, the location of the dynamic virtual object may need to be positioned in the XR scene precisely relative to the position of the user in the XR scene. For example, if the user is interacting with dynamic virtual objects, e.g., in a virtual conference or a video game, one or more dynamic virtual objects may need precise, accurate user positioning information for streaming sessions associated with the dynamic virtual objects. Thus, the QoS and charging information may need to take account of the need for the accurate user positioning information. For example, for those streaming sessions needing accurate user positioning information may be assigned a higher QoS than streaming sessions associated with other dynamic virtual objects, such as heads up display (HUD) elements. If the game is a sports game, for example, a ball dynamic virtual object such as a baseball or football may need accurate user positioning information such that the user can interact with (hit, catch, throw, etc.) the ball.

As noted above, in some cases, client device 40 may be configured to perform split rendering of XR data. When performing split rendering, an ultra-low delay coding structure may be used to code media data. For example, video frames may be coded in an IPPP structure, where a first frame is coded using intra-coding, and subsequent frames are uni-directional inter-predicted. None of the frames in the IPPP are bi-directional inter-predicted, and thus, the bitrate for such a coding structure may be, e.g., approximately 30% higher than for other coding structures, such as IBBP. Additionally, each coded frame may be frame packed, that is, the frames may include data for both left and right eye views, packed together in the form of a single frame. Accordingly, the QoS and charging requirements may take account of this coding structure. For example, when client device 40 is configured to perform split rendering, a bitrate (such as a minimum bitrate) for the split rendered media streams may be higher than a bitrate (such as a minimum bitrate) for non-split-rendered media streams.

FIG. 2 is a block diagram illustrating an example computing system 100 that may perform techniques of this disclosure. In this example, computing system 100 includes extended reality (XR) server device 110, network 130, XR client device 140, and display device 152. XR server device 110 includes XR scene generation unit 112, XR viewport pre-rendering rasterization unit 114, 2D media encoding unit 116, XR media content delivery unit 118, and 5G System (5GS) delivery unit 120. XR server device 110 may further include components that perform functionality attributed to content preparation device 20 and server device 60 of FIG. 1. For example, 5GS delivery unit 120 may correspond to network interface 72 of FIG. 1, XR scene generation unit 112 and XR viewport pre-rendering rasterization unit 114 may correspond to video source 24 of FIG. 1, 2D media encoding unit 116 may correspond to video encoder 28, and XR media content delivery unit 118 may correspond to encapsulation unit 30 and request processing unit 70 of FIG. 1.

Network 130 may generally correspond to network 74 of FIG. 1. Network 130 may correspond to any network of computing devices that communicate according to one or more network protocols, such as the Internet. In particular, network 130 may include a 5G radio access network (RAN) including an access device to which XR client device 140 connects to access network 130 and XR server device 110. In other examples, other types of networks, such as other types of RANs, may be used.

XR client device 140 includes 5GS delivery unit 150, tracking/XR sensors 146, XR viewport rendering unit 142, 2D media decoder 144, and XR media content delivery unit 148. XR client device 140 also interfaces with display device 152 to present XR media data to a user (not shown). XR client device 140 may include components that perform functionality attributed to client device 40 of FIG. 1. For example, 5GS delivery unit 150 may correspond to network interface 54 of FIG. 1 and XR media content delivery unit 148 may correspond to retrieval unit 52 of FIG. 1.

In some examples, XR scene generation unit 112 may correspond to an interactive media entertainment application, such as a video game, which may be executed by one or more processors implemented in circuitry of XR server device 110. XR viewport pre-rendering rasterization unit 114 may format scene data generated by XR scene generation unit 112 as pre-rendered two-dimensional (2D) media data (e.g., video data) for a viewport of a user of XR client device 140. 2D media encoding unit 116 may encode formatted scene data from XR viewport pre-rendering rasterization unit 114, e.g., using a video encoding standard, such as ITU-T H.264/Advanced Video Coding (AVC), ITU-T H.265/High Efficiency Video Coding (HEVC), ITU-T H.266 Versatile Video Coding (VVC), or the like. XR media content delivery unit 118 represents a content delivery sender, in this example. In this example, XR media content delivery unit 148 represents a content delivery receiver, and 2D media decoder 144 may perform error handling.

In general, XR client device 140 may determine a user's viewport, e.g., a direction in which a user is looking and a physical location of the user, which may correspond to an orientation of XR client device 140 and a geographic position of XR client device 140. Tracking/XR sensors 146 may determine such location and orientation data, e.g., using cameras, accelerometers, magnetometers, gyroscopes, or the like. Tracking/XR sensors 146 provide location and orientation data to XR viewport rendering unit 142 and 5GS delivery unit 150. XR client device 140 provides tracking and sensor information 132 to XR server device 110 via network 130. XR server device 110, in turn, receives tracking and sensor information 132 and provides this information to XR scene generation unit 112 and XR viewport pre-rendering rasterization unit 114. In this manner, XR scene generation unit 112 can generate scene data for the user's viewport and location, and then pre-render 2D media data for the user's viewport using XR viewport pre-rendering rasterization unit 114. XR server device 110 may therefore deliver encoded, pre-rendered 2D media data 134 to XR client device 140 via network 130, e.g., using a 5G radio configuration.

XR scene generation unit 112 may receive data representing a type of multimedia application (e.g., a type of video game), a state of the application, multiple user actions, or the like. XR viewport pre-rendering rasterization unit 114 may format a rasterized video signal. 2D media encoding unit 116 may be configured with a particular encoder/decoder (codec), bitrate for media encoding, a rate control algorithm and corresponding parameters, data for forming slices of pictures of the video data, low latency encoding parameters, error resilience parameters, intra-prediction parameters, or the like. XR media content delivery unit 118 may be configured with real-time transport protocol (RTP) parameters, rate control parameters, error resilience information, and the like. XR media content delivery unit 148 may be configured with feedback parameters, error concealment algorithms and parameters, post correction algorithms and parameters, and the like.

Raster-based split rendering refers to the case where XR server device 110 runs an XR engine (e.g., XR scene generation unit 112) to generate an XR scene based on information coming from an XR device, e.g., XR client device 140 and tracking and sensor information 132. XR server device 110 may rasterize an XR viewport and perform XR pre-rendering using XR viewport pre-rendering rasterization unit 114.

In the example of FIG. 2, the viewport is predominantly rendered in XR server device 110, but XR client device 140 is able to do latest pose correction, for example, using asynchronous time-warping or other XR pose correction to address changes in the pose. XR graphics workload may be split into rendering workload on a powerful XR server device 110 (in the cloud or the edge) and pose correction (such as asynchronous timewarp (ATW)) on XR client device 140. Low motion-to-photon latency is preserved via on-device Asynchronous Time Warping (ATW) or other pose correction methods performed by XR client device 140.

In some examples, latency from rendering video data by XR server device 110 and XR client device 140 receiving such pre-rendered video data may be in the range of 50 milliseconds (ms). Latency for XR client device 140 to provide location and position (e.g., pose) information may be lower, e.g., 20 ms, but XR server device 110 may perform asynchronous time warp to compensate for the latest pose in XR client device 140.

The following call flow is an example highlighting steps of performing these techniques:

1) XR client device 140 connects to network 130 and joins an XR application (e.g., executed by XR scene generation unit 112).
   a) XR client device 140 sends static device information and capabilities (supported decoders, viewport).
2) Based on this information, XR server device 110 sets up encoders and formats.
3) Loop:
   a) XR client device 140 collects XR pose (or a predicted XR pose) using tracking/XR sensors 146.
   b) XR client device 140 sends XR pose information, in the form of tracking and sensor information 132, to XR server device 110.
   c) XR server device 110 uses tracking and sensor information 132 to pre-render an XR viewport via XR scene generation unit 112 and XR viewport pre-rendering rasterization unit 114.
   d) 2D media encoding unit 116 encodes the XR viewport.
   e) XR media content delivery unit 118 and 5GS delivery unit 120 send the compressed media to XR client device 140, along with data representing the XR pose that the viewport was rendered for.
   f) XR client device 140 decompresses the video data using 2D media decoder 144.
   g) XR client device 140 uses the XR pose data provided with the video frame and the actual XR pose from tracking/XR sensors 146 for an improved prediction and to correct the local pose, e.g., using ATW performed by XR viewport rendering unit 142.

Various types of client devices (also referred to as "user equipment" or "UE") may perform XR. XR client device 140 may conform to one of these various types, or another type. Table 1 below describes several different types of client devices that may perform split rendering of XR data over a 5G network. In general, split rendering refers to rendering an image by two or more distinct devices. In one example, split rendering may be defined as follows:

The tethered device or external entity (such as a cloud or edge device) does some pre-processing (e.g., a pre-rendering of the viewport based on sensor and pose information), and the XR device and/or tethered device performs a rendering considering the latest sensor information (e.g., applying pose correction). Different degrees of split exist, between different devices and entities. Similarly, vision engine functionalities and other XR/AR/MR functions (such as AR/MR media reconstruction, encoding and decoding) can be subject to split computation.

Table 1 shows, for various examples of device types that participate in XR, how the devices are connected to get access to information, where the 5G Uu modem is expected to be placed, where the basic AR functions are placed, where the AR/MR functions are placed, where the AR/MR application is running, and where the power supply/battery is placed. In all glass device types, sensors, cameras, and microphones are assumed to be on the device (UE) itself

TABLE 1

5G Augmented Reality Device Types

| Device Type Name | Reference | Tethering | 5G Uu Modem | Basic AR Functions | AR/MR Functions | AR/MR Application | Power Supply |
|---|---|---|---|---|---|---|---|
| 5G Standalone AR UE (STAR) | 1: STAR | N/A | Device | Device | Device/Split [1] | Device | Device |
| 5G EDGe-Dependent AR UE (EDGAR) | 2: EDGAR | N/A | Device | Device | Split [1] | Cloud/Edge | Device |
| 5G WireLess Tethered AR UE | 3: WLAR | 802.11ad, 5G sidelink, etc. | Tethered device (phone/puck) | Device | Split [2] | Tethered device | Device |
| 5G Wired Tethered AR UE [3] | 4: WTAR | USB-C | Tethered device (phone/puck) | Tethered device | Split [2] | Tethered device | Tethered device |

[1] Cloud/Edge
[2] Phone/Puck and/or Cloud/Edge
[3] Not considered in this document The Type 1 5G STandalone AR (STAR) UE may have the following characteristics:

The STAR UE is a regular 5G UE. 5G connectivity is provided through an embedded 5G modem User control is local and is obtained from sensors, audio inputs or video inputs AR/MR functions are either on the AR/MR device, or split Some devices might have limited support for immersive media decoding and rendering and may need to rely on 5G cloud/edge. In this case the STAR UE may be assisted by an edge.

The AR/MR application is resident on the device

Due to the amount of processing required, such devices are likely to require a higher power consumption in comparison to the other device types.

Functionality is more important than design

As the device includes all UE functionalities, the application resides and predominantly is executed on the device and all essential AR/MR functions are available for typical media processing use cases, the device referred to as STandalone AR (STAR) UE.

The Type 2 5G EDGe-Dependent AR (EDGAR) UE may have the following characteristics:

The 5G EDGAR UE is a regular 5G UE. 5G connectivity is provided through an embedded 5G modem User control is local and is obtained from sensors, audio inputs or video inputs.

Media processing is local, the device needs to embed all media codecs required for decoding pre-rendered viewports The basic AR Functions are local to the AR/MR device, and the AR/MR functions are on the 5G cloud/edge The main AR/MR application resides on the cloud/edge, but a basic application functionality is on the UE to support regular UE functionalities and launching services and applications.

Power consumption on such glasses must be low enough to fit the form factors. Heat dissipation is essential.

Design is typically more important than functionality.

While the EDGAR UE may have additional functionalities, for example those available in a STAR UE, generally for media centric use cases processing needs to be supported by the edge.

The Type 3 5G WireLess Tethered AR UE may have the following characteristics:

5G connectivity is provided through a tethered device which embeds the 5G modem. Wireless tethered connectivity is through WiFi or 5G sidelink. BLE (Bluetooth Low Energy) connectivity may be used for audio.

User control is mostly provided locally to the AR/MR device; some remote user interactions may be initiated from the tethered device as well.

AR/MR functions (including SLAM/registration and pose correction) are either in the AR/MR device, or split.

While media processing (for 2D media) can be done locally to the AR glasses, heavy AR/MR media processing may be done on the AR/MR tethered device or split.

Some devices might have limited support for immersive media decoding and rendering and may need to rely on 5G cloud/edge While such devices are likely to use significantly less processing than Type 1: 5G STAR devices by making use of the processing capabilities of the tethered device, they can still support a lot of local media and AR/MR processing. Such devices are expected to provide 8-10 h of battery life while keeping a significantly low weight.

The tethered glass itself is not a regular 5G UE, but the combination of the glass and the phone results in a regular 5G UE.

An augmented reality (AR) use case for a virtual gym may be as follows: A user launches a virtual trainer application on AR glasses (e.g., client device 140). The AR glasses present a list of available training routines. The user picks one of the routines for morning exercise. The AR glasses present a virtual coach and another student within the user's room. A virtual loudspeaker presents, via an actual speaker (e.g., built into the AR glasses or another device in the user's room) background music. The AR glasses then present the virtual coach and the other student as beginning to exercise, and also vocal instructions provided by the virtual coach.

Various components of XR client device 140 may form part of one of an AR runtime, a scene manager, or a 5G media client. For example, tracking/XR sensors 146 may represent the AR runtime, XR viewport rendering unit 142 may represent the scene manager, and 5GS delivery unit 150 may represent the 5G media client. In general, the AR runtime may expose, through an API, access to AR device functionality, the scene manager may provide a function that parses a description of a scene and then uses it to fetch media, process input, and render the scene, and the 5G media client may represent a collection of functions that enables access to media and requests resources to support the AR session, e.g., from XR server device 110.

XR data may include an entry point, dynamic virtual objects, static virtual objects, and spatial audio. The entry point may include a scene description that describes the objects in the scene. Dynamic virtual objects may be dynamic meshes, animated meshes, point clouds, or the like. In general, dynamic virtual objects may move within the XR scene and sounds may originate from the corresponding location of a dynamic virtual object. Static objects may be static meshes and may represent locations from which audio may originate. Spatial audio may represent vocalizations (e.g., speech) from a person (represented as a dynamic virtual object) and/or other sound elements (e.g., music, white noise, or the like) for which static or dynamic virtual objects are the source.

Figure 3:
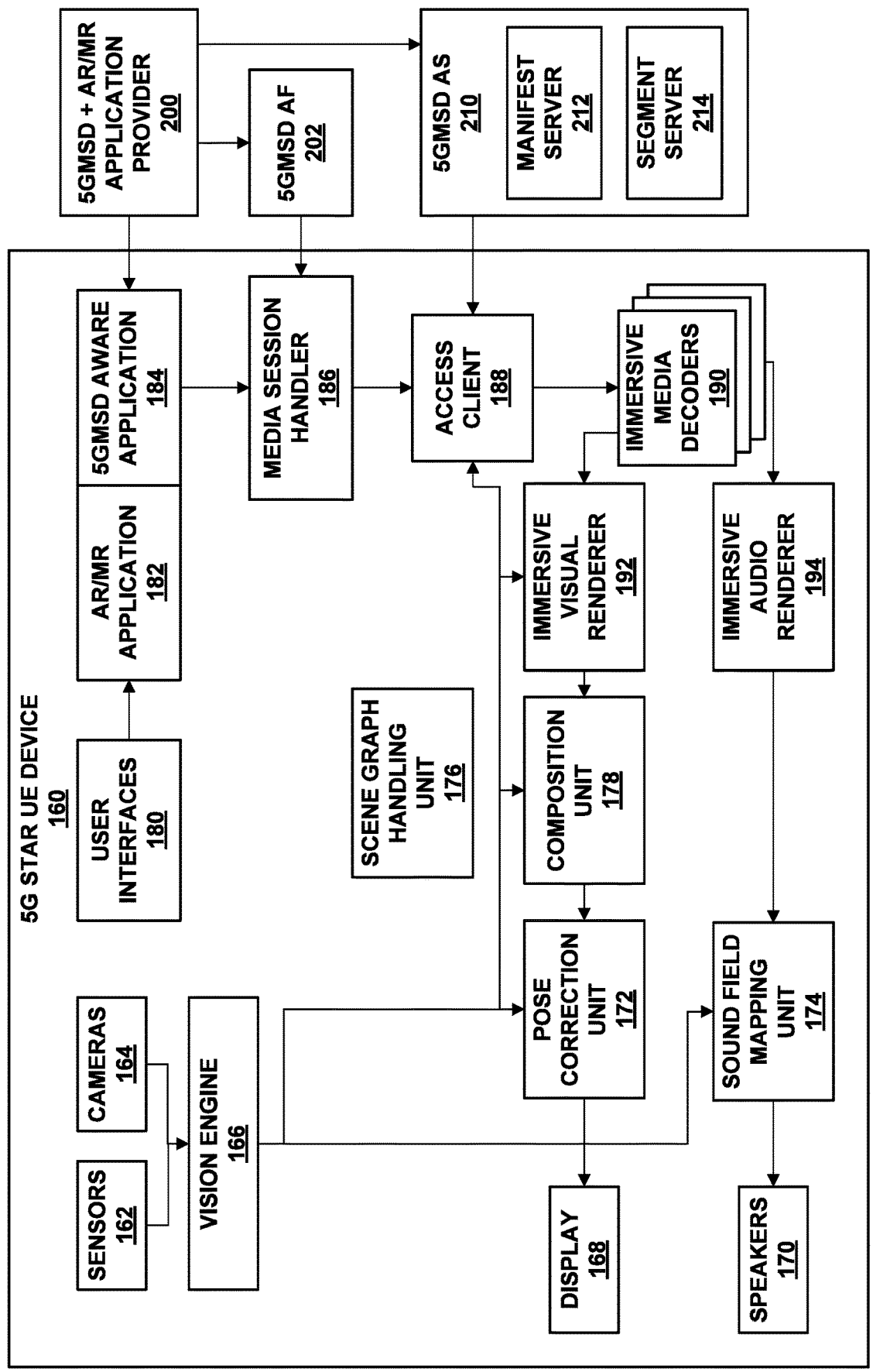
FIG. 3 is a block diagram illustrating an example client device configured as 5G STandalone AR (STAR) user equipment according to the techniques of this disclosure.

FIG. 3 is a block diagram illustrating an example client device configured as 5G STandalone AR (STAR) user equipment (UE) device 160 according to the techniques of this disclosure. XR client device 140 of FIG. 2 may be configured according to the example of FIG. 3.

In the example of FIG. 3, 5G STAR UE device 160 includes sensors 162, cameras 164, vision engine 166, user interfaces 180, AR/MR application 182, a 5G Media Streaming downlink (5GMSd) aware application 184, media session handler (MSH) 186, scene graph handling unit 176, access client 188, immersive media decoders 190, immersive visual renderer 192, immersive audio renderer 194, composition unit 178, pose correction unit 172, sound field mapping unit 174, display 168, and speakers 170. Each of these various units may be implemented in hardware, software, or firmware, or a combination thereof. When implemented in software or firmware, instructions for the software or firmware may be stored in a hardware memory and executed by requisite hardware processing circuitry.

Sensors 162 may be, for example, gyroscopic sensors that are configured to detect pose information of a user. Sensors 162 and cameras 164 collect pose information and images and pass data for the pose and images to vision engine 166. Vision engine 166 may provide the pose information to pose correction unit 172, composition unit 178, immersive visual renderer 192, and access client 188. User interfaces 180 may include, for example, game controllers, buttons, joysticks, or the like for collecting user input. User interfaces 180 may pass user input to augmented reality/mixed reality (AR/MR) application 182.

AR/MR application 182 and 5GMSd aware application 184 may be the same application or separate applications that communicate with each other. In general, AR/MR application 182 may obtain user input from user interfaces 180 as well as from other users via 5GMSd aware application 184 and/or from a server associated with the application, such as 5GMSd+AR/MR application provider 200. AR/MR application 182 may determine what is to be presented to a user of 5G STAR UE device 160 according to the various inputs from the server, the user, and the other users, e.g., virtual objects to be displayed, animations to be applied to dynamic virtual objects, or the like. Animations may be streamed as dynamic media components for the dynamic virtual objects. 5GMSd aware application 184 may pass information to media session handler (MSH) 186, which may also receive information from 5GMSd application function (AF) 202.

MSH 186 may provide the information to access client 188, which may also receive one or more media streams from 5GMSd application server (AS) 210. In particular, according to the techniques of this disclosure, each of the various dynamic virtual objects may be associated with a respective media streaming session with, e.g., 5GMSd AS 210. That is, media data for each of the various dynamic virtual objects may be sent to 5G STAR UE device 160 via a respective, distinct media streaming session. Each of the media streaming sessions may have a respective manifest file (e.g., an MPD) received from manifest server 212 and media data provided by segment server 214.

Access client 188 may initialize each of the various media streaming sessions as discussed below with respect to, e.g., FIGS. 5 and 6. According to the techniques of this disclosure, each of the media streaming sessions may have respective associated quality of service (QoS) and charging configuration, e.g., according to a type for the dynamic virtual object. For example, the QoS and charging configuration may depend on whether the corresponding dynamic virtual object is a 2D or 3D object, whether accurate user position information is needed, an amount of bandwidth needed for the media streaming session, whether 5G STAR UE device 160 is configured to perform split rendering (in the example of FIG. 3, 5G STAR UE device 160 does not perform split rendering), or the like. Access client 188 may receive media data for the various media streaming sessions and provide the media data to immersive media decoders 190.

By configuring the QoS and charging information for each dynamic virtual object, 5G STAR UE device 160 may cause media data for certain dynamic virtual objects to be delivered with higher priority than other media data. For example, if a certain dynamic virtual object requires accurate position information for the user of 5G STAR UE device 160 (e.g., a dynamic virtual object for which collision detection with the user of 5G STAR UE device 160 is enabled), such position information may need to be provided to 5GMSd AS 210 more urgently than other data. Providing media data for different dynamic virtual objects in separate, respective media streams allows certain media data (and input used to generate the media data) to be delivered in a prioritized fashion and other media data to be delivered in a de-prioritized (best-effort) fashion, which may increase flexibility in utilizing the available network bandwidth. Furthermore, by individually configuring QoS and chagrining information the QoSs for all streaming sessions can be more easily achieved.

Each of the media streams may be associated with a respective one of immersive media decoders 190. Immersive media decoders 190 may decode audio and video media data and pass the decoded audio data to immersive audio renderer 194 and the decoded video data to immersive visual renderer 192. Immersive visual renderer 192 may render the video data for each of the various dynamic virtual objects and provide the rendered media data to composition unit 178. Composition unit 178 may compose a single frame (or multiple frames, e.g., left and right eye frames for 3D presentation) including data for each of the various dynamic virtual objects, and provide the frames to pose correction unit 172. Pose correction unit 172 may modify the composed frames according to a current user pose, e.g., by rotating or translating images in the frames, then provide the pose-corrected frames to display 168 for display to the user. Immersive audio renderer 194 may render audio data and provide the rendered audio data to sound field mapping unit 174. Sound field mapping unit 174 may use the pose information to modify the received rendered audio data, e.g., according to the pose and relative position of the user to the position of the object from which the audio is being presented.

Figure 4:
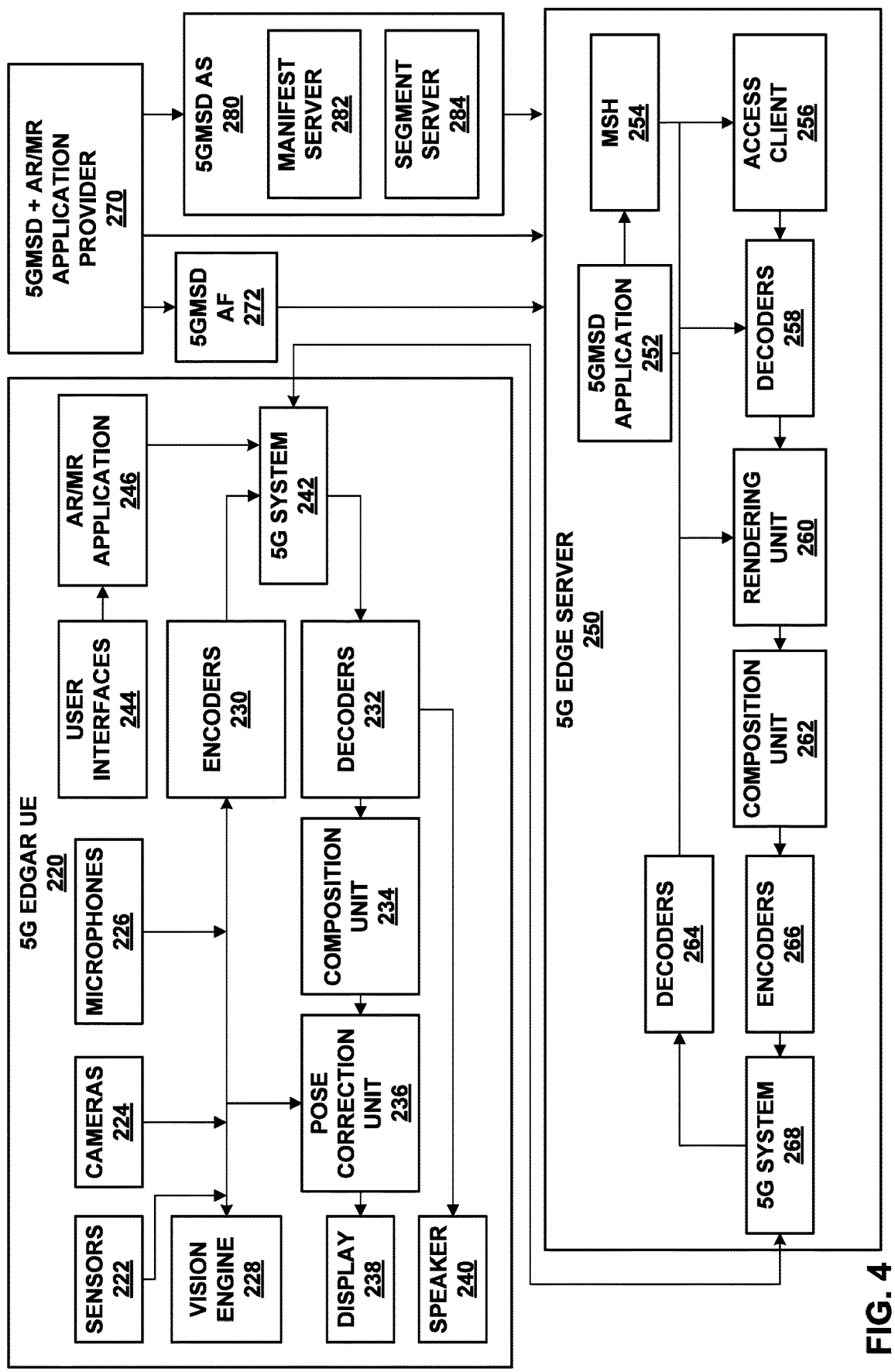
FIG. 4 is a block diagram illustrating another example client device configured as 5G EDGe-Dependent AR (ED-GAR) user equipment according to the techniques of this disclosure.

FIG. 4 is a block diagram illustrating another example client device configured as 5G EDGe-Dependent AR (ED-GAR) user equipment (UE) device 220 according to the techniques of this disclosure. XR client device 140 of FIG. 2 may be configured according to the example of FIG. 4. In this example, 5G EDGAR UE device 220 is configured to perform split rendering along with 5G EDGE server device 250.

In this example, 5G EDGAR UE device 220 includes sensors 222, cameras 224, microphones 226, vision engine 228, encoders 230, 5G system 242, decoders 232, composition unit 234, pose correction unit 236, display 238, speaker 240, 5G system 242, user interfaces 244, and AR/MR application 246. 5G EDGE server device 250 in this example includes 5GMSd application 252, MSH 254, access client 256, decoders 258, rendering unit 260, composition unit 262, decoders 264, encoders 266, and 5G system 268. Each of these various units may be implemented in hardware, software, or firmware, or a combination thereof. When implemented in software or firmware, instructions for the software or firmware may be stored in a hardware memory and executed by requisite hardware processing circuitry.

In general, the various components of 5G EDGAR UE device 220 and 5G EDGE server device 250 operate together to perform split rendering in a manner substantially similar to the corresponding components of 5G STAR UE device 160 of FIG. 3. That is, 5G EDGE server device 250 performs a first rendering process, and provides the results of the first rendering process to 5G EDGAR UE device 220, which performs a second rendering process to ultimately output rendered video and audio data via display 238 and speaker 240.

In this example, 5G EDGE server device 250 communicates with 5GMSd+AR/MR application provider 270, 5GMSd 272, and 5GMSd AS 280. In accordance with the techniques of this disclosure, 5G EDGE server device 250 initializes respective media streaming sessions for dynamic virtual objects of an XR scene from 5GMSd AS 280. As discussed above with respect to FIG. 3, each of the media streaming sessions may include a respective manifest file provided by manifest server 282 and media data segments provided by segment server 284.

According to the techniques of this disclosure, each of the media streaming sessions may have respective associated quality of service (QoS) and charging configuration, e.g., according to a type for the dynamic virtual object. For example, the QoS and charging configuration may depend on whether the corresponding dynamic virtual object is a 2D or 3D object, whether accurate user position information is needed, an amount of bandwidth needed for the media streaming session, whether 5G EDGAR UE device 220 is configured to perform split rendering (in the example of FIG. 4, 5G EDGAR UE device 220 is configured to perform split rendering), or the like. Access client 256 may receive media data for the various media streaming sessions and provide the media data to decoders 258.

The first rendering process, in this example, includes decoding of the media data of the various media streaming sessions by decoders 258. Rendering unit 260 may render video data for each of the various media streaming sessions, and composition unit 262 may compose frames including rendered data for each of the dynamic virtual objects. Encoders 266 may then, in this example, encode the rendered frames, and 5G EDGE server device 250 may transmit the rendered frames to 5G EDGAR UE device 220 via 5G system 268.

5G EDGAR UE device 220, in this example, performs a second rendering process after receiving the encoded rendered frames via 5G system 242. Decoders 232 decode the rendered frames, composition unit 234 may further compose the frames to include data for one or more additional virtual objects. Pose correction unit 236 may then modify the composite frames to account for updated user pose information collected by sensors 222 and/or cameras 224. Ultimately, 5G EDGAR UE device 220 may output the frames via display 238. Similarly, 5G EDGAR UE device 220 may output audio data via speaker 240. Although not shown in the example of FIG. 4, 5G EDGAR UE device 220 may further include a sound field mapping unit as in the example of FIG. 3, which may modify audio data according to the updated pose information.

Figure 5:
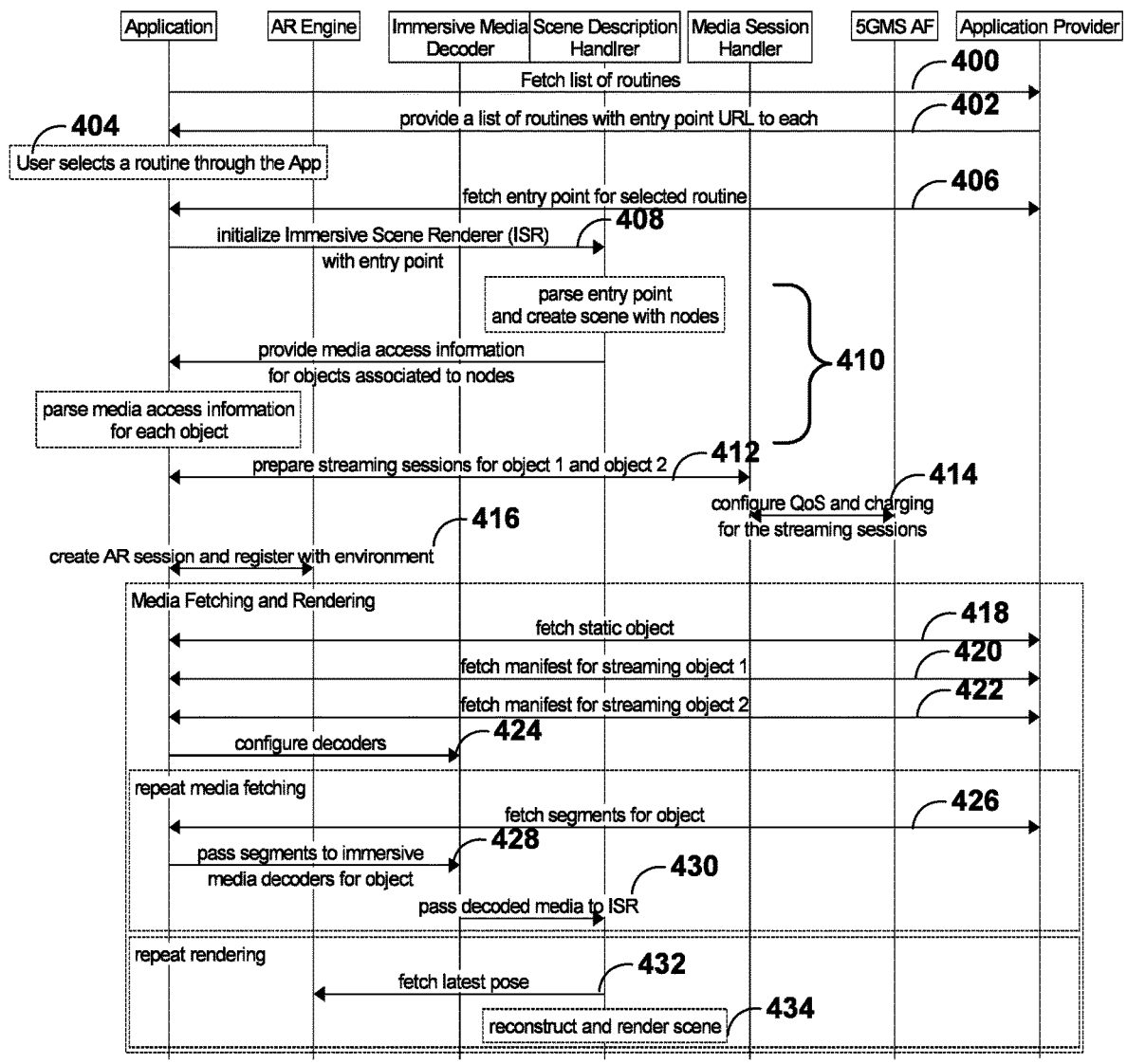
FIG. 5 is a call flow diagram illustrating an example augmented reality session for STAR user equipment according to the techniques of this disclosure.

FIG. 5 is a call flow diagram illustrating an example augmented reality session for STAR user equipment according to the techniques of this disclosure. When XR client device 140 is configured according to the example of FIG. 3, XR client device 140 may perform certain aspects of the call flow of FIG. 5, e.g., those functions attributed to AR/MR application 182, an AR engine thereof, immersive media decoders 190, a scene description handler (e.g., scene graph handling unit 176), and media session handler (MSH) 186. When XR client device 140 is configured according to the example of FIG. 4, XR client device 140 may perform split rendering as discussed above with respect to FIG. 4.

In the example of FIG. 5, initially, a user starts the application. The application connects to the cloud to fetch a list of exercise routines for the user (400).

The application provider (AP) sends a list of routines to the application (402). Each routine is associated with an entry point for that routine. The entry point is typically a scene description that describes the objects in the scene and anchors the scene with the world space.

The application receives a routine selection from the user (404).

The application fetches the scene description for the selected routine from the application provider (406). The application also initializes an immersive scene renderer (ISR) with an entry point (408).

The session description handler parses the entry point to extract information about required objects in the scene and provides media access information to the application (410). In the example use case above, the coach, the student, and a speaker are the 3 objects that will be rendered in the scene. The coach and the student are examples of dynamic virtual objects. The loudspeaker is an example of a static virtual object.

The application informs the MSH that it will start 2 streaming sessions for the 2 dynamic virtual objects (412). For example, each of the 2 streaming sessions may be a Protocol Data Unit (PDU) session according to the PDU session user plane protocol.

The MSH shares the information with the AF and based on existing provisioning by the Application Provider, the AF may request QoS and charging modifications to the PDU sessions (414). For example, the AF may notify a policy control function (PCF) of the request. And the PCF may initiate or modify the PDU session. In some implementations, the anchor point for a PDU session may be a User Plane Function (UPF). Then, the PCF may ensure that an according QoS flow is assigned via the UPF to the respective PDU session. By sharing the information, the MSH may be configured with streaming sessions complying with respective QoS and charging information.

The application creates a new XR session and anchors the scene to a selected space in the XR session, and then a media exchange begins. In particular, in the example use case above, application fetches data for the static object in the scene, the loudspeaker in this example (418). The application then retrieves the manifest for object 1 (420) and for object 2 (422). In the example use case above, object 1 is a dynamic virtual object of the coach, and object 2 is a dynamic virtual object of the other student.

The application then configures immersive video decoders based on the components of each object (424). The application then retrieves media segments for each component of each object (426). A media decoder decodes the media segments (428) and passes the decoded media data to an immersive media renderer (430).

The immersive visual renderer periodically renders a frame by iteratively determining a latest pose of the user (432) and reconstructing each object and rendering it to a swapchain image. The swapchain image is passed to the compositor for rendering (434).

Figure 6:
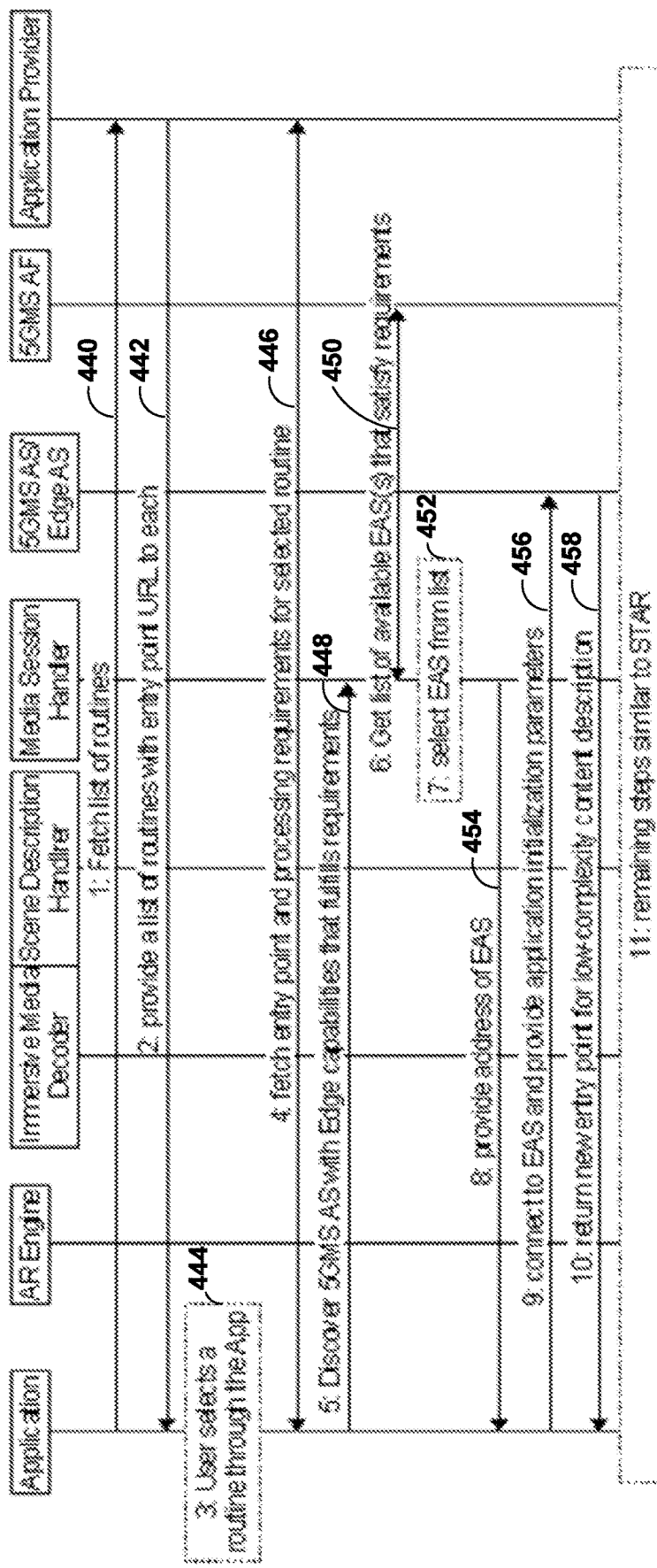
FIG. 6 is a call flow diagram illustrating an example augmented reality session for EDGAR user equipment according to the techniques of this disclosure.

FIG. 6 is a call flow diagram illustrating an example augmented reality session for EDGAR user equipment according to the techniques of this disclosure. When XR client device 140 is configured according to the example of FIG. 4, XR client device 140 may perform certain aspects of the call flow of FIG. 6, e.g., those functions attributed to 5GMSD application 252 and a corresponding AR engine. An EDGE server, such as 5G EDGE server device 250 of FIG. 4, may participate in the techniques of FIG. 6 in the form of split rendering, where the EDGE server may include immersive media decoders 258, a scene description handler, and media session handler (MSH) 254.

A user starts the application. The application connects to the cloud to fetch a list of media programs (e.g., exercise routines) for the user (440).

The application provider (AP) sends a list of programs (e.g., routines) to the application (442). Each routine is associated with an entry point for that routine. The entry point is typically a scene description that describes the objects in the scene and anchors the scene with the world space.

The application receives a routine of preference selection from the user (444).

The application sends a request for the entry point to the selected content (446). The Application Provider responds with an entry point to a scene description and a list of requirements for optimal processing of the scene. The application determines that EDGE support is required and sends a request to the MSH to discover an appropriate Edge Application Server (AS) that can serve the application (448).

The MSH sends the requirements to the AF and receives a list of candidate edge application server(s) (EASs) (450).

The MSH selects an appropriate EAS from the list of candidates (452).

The MSH provides the location of the EAS to the application (454).

The application connects to the EAS and provides initialization information (456). The initialization information contains: the URL to the scene description entry point or the actual scene description, its current processing capabilities, supported formats and protocols, and the like.

The EAS configures the server application accordingly and generates a customized entry point for the client (458). The formats may depend on the capabilities of the UE. The EAS adjusts the amount of processing performed by the EAS based on the current capabilities of the application. For example, The EAS may perform scene lighting and ray tracing and then generate a simplified 3D scene description for the application. A less-capable UE may receive a more flattened scene, which contains stereo eye views and some depth information.

The rest of the steps are similar to steps 410 to 434 from the STAR call flow of FIG. 5.

In this manner, the methods of FIGS. 5 and 6 represent examples of a method of processing extended reality (XR) data including: parsing entry point data of a scene to extract information about one or more required virtual objects for an XR scene, the one or more required virtual objects including a number of dynamic virtual objects greater than one; initializing a number of streaming sessions equal to the number of dynamic virtual objects using the entry point data, wherein initializing the number of streaming sessions includes configuring quality of service (QoS) and charging information for the streaming sessions; retrieving media data for each of the number of dynamic virtual objects via one of the respective number of streaming sessions; and sending the retrieved media data to a rendering unit to render the XR scene to include the retrieved media data at corresponding locations within the XR scene.

Figure 7:
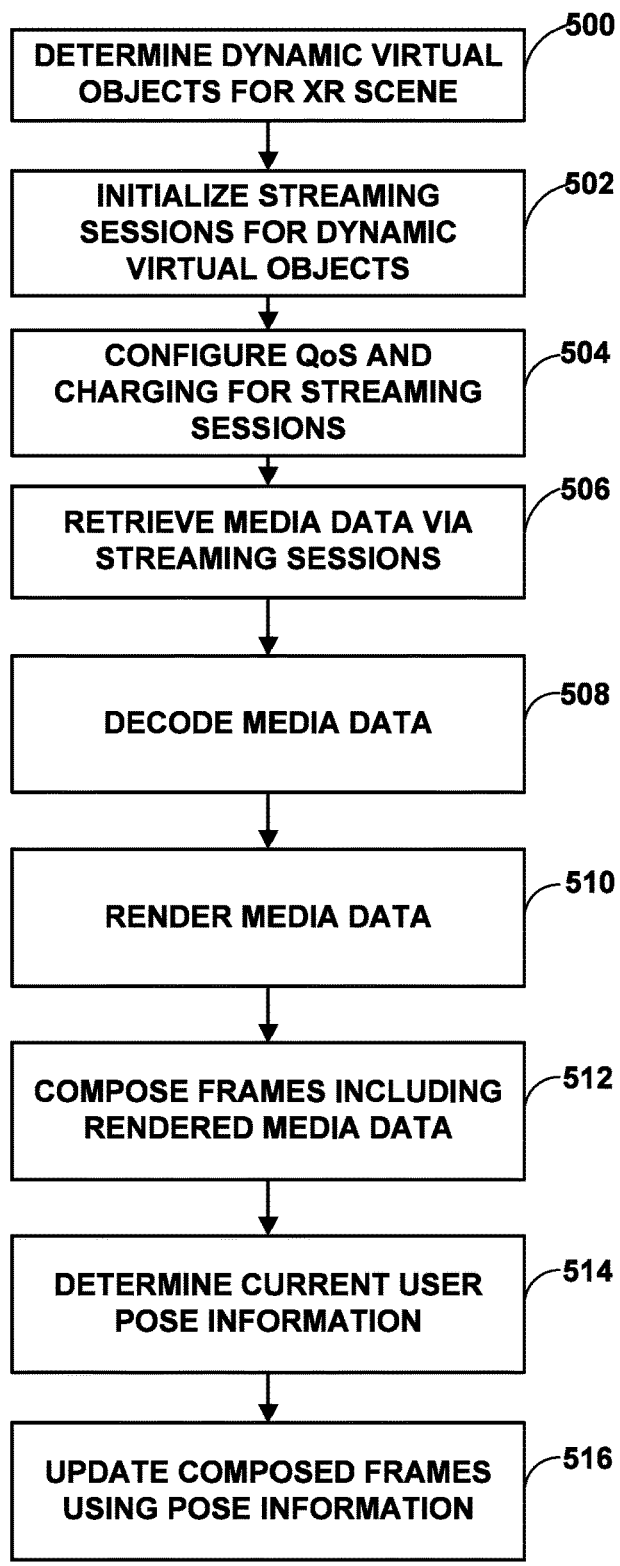
FIG. 7 is a flowchart illustrating an example method of processing XR data according to techniques of this disclosure.

FIG. 7 is a flowchart illustrating an example method of processing XR data according to techniques of this disclosure. The method of FIG. 7 may generally be performed by an XR client device, such as client device 40 of FIG. 1 or XR client device 140 of FIG. 2. The XR client device may be configured to perform solo rendering, per the example of 5G STAR UE device 160 of FIG. 3, or split rendering, per the example of 5G EDGAR UE device 220 of FIG. 4. For purposes of explanation, the method of FIG. 7 is explained with respect to XR client device 140 of FIG. 2.

Initially, XR client device 140 may determine one or more dynamic virtual objects for an XR scene (500). For example, XR client device 140 may receive and parse a scene description including entry point data of an XR scene. XR client device 140 may extract information about one or more required virtual objects for the XR scene. The required virtual objects may include one or more dynamic virtual objects, i.e., virtual objects designed to change over time. In some examples, the required virtual objects may also include static virtual objects.

XR client device 140 may initialize a media streaming session for the XR scene, and one or more additional media streaming sessions for each of the dynamic virtual objects (502). Thus, if there are N dynamic virtual objects, XR client device 140 may initialize N+1 media streaming sessions, one for the XR scene and one for each of the dynamic virtual objects.

In addition, XR client device 140 may determine types for the dynamic virtual objects and configure quality of service (QoS) and charging for the streaming sessions (504). For example, XR client device 140 may determine the QoS and charging according to whether media data for the dynamic virtual objects is 2D or 3D, amounts of bandwidth needed for the media streaming sessions, whether accurate user positioning information is needed for the media streaming sessions, and/or whether XR client device 140 is configured to perform solo rendering or split rendering.

XR client device 140 may then retrieve media data for the XR scene and the dynamic virtual objects via the respective media streaming sessions (506). XR client device 140 may decode media data received via each of the media streaming sessions (508). XR client device 140 may also render the received media data (510). XR client device 140 may further compose video frames including the rendered media data (512). In some cases, XR client device 140 may determine current user pose information (514) and update the composed frames using the pose information (516). Ultimately, XR client device 140 may display the frames.

In this manner, the method of FIG. 7 represents an example of a method of processing extended reality (XR) data including: parsing entry point data of a scene to extract information about one or more required virtual objects for an XR scene, the one or more required virtual objects including a number of dynamic virtual objects greater than one; initializing a number of streaming sessions equal to the number of dynamic virtual objects using the entry point data, wherein initializing the number of streaming sessions includes configuring quality of service (QoS) and charging information for the streaming sessions; retrieving media data for each of the number of dynamic virtual objects via one of the respective number of streaming sessions; and sending the retrieved media data to a rendering unit to render the XR scene to include the retrieved media data at corresponding locations within the XR scene.

Various example techniques of this disclosure are summarized in the following clauses:

Clause 1: A method of processing extended reality (XR) data, the method comprising: parsing entry point data of a scene to extract information about one or more required virtual objects for an XR scene, the one or more required virtual objects including a number of dynamic objects virtual greater than one; initializing a number of streaming sessions equal to the number of dynamic virtual objects; retrieving media data for each of the number of dynamic virtual objects via one of the respective number of streaming sessions; and sending the retrieved media data to a rendering unit to render the XR scene to include the retrieved media data at corresponding locations within the XR scene.

Clause 2: The method of clause 1, further comprising: creating an XR session; and anchoring the XR scene to a real world space for the XR session.

Clause 3: The method of any of clauses 1 and 2, wherein the required virtual objects further include one or more static virtual objects, the method further comprising retrieving media data for each of the one or more static virtual objects, and wherein rendering the XR scene further includes rendering the XR scene to include the retrieved media data for the one or more static virtual objects at corresponding locations within the XR scene.

Clause 4: The method of any of clauses 1-3, wherein retrieving the media data for each of the number of dynamic virtual objects comprises: retrieving manifest files for each of the number of dynamic virtual objects; and retrieving media segments for each of the number of dynamic virtual objects using the respective manifest files.

Clause 5: The method of clause 4, wherein the manifest files comprise Media Presentation Descriptions (MPDs).

Clause 6: The method of any of clauses 1-5, further comprising configuring immersive video decoders for each of the number of dynamic virtual objects.

Clause 7: The method of any of clauses 1-6, further comprising: retrieving a list of available XR sessions, each of the available XR sessions having associated entry point data; receiving a selection of one of the available XR sessions; and retrieving a scene description for the selected one of the available XR sessions, the scene description including the entry point data associated with the selected one of the available XR sessions.

Clause 8: The method of any of clauses 1-6, further comprising: retrieving a list of available XR sessions, each of the available XR sessions having associated entry point data; receiving a selection of one of the available XR sessions; requesting the entry point data associated with the one of the available XR sessions; receiving the requested entry point data and data representing requirements for optimal processing of a scene for the selected one of the available XR sessions; in response to determining that the requirements include Edge support, requesting data representing an Edge Application Server (AS) for the selected one of the available XR sessions; sending, to the Edge AS, initialization information for the selected one of the available XR sessions; and receiving, from the Edge AS, customized entry point data for the selected one of the available XR sessions.

Clause 9: The method of any of clauses 1-8, wherein the entry point data includes a scene description including the information about the one or more required virtual objects for the XR scene.

Clause 10: The method of any of clauses 1-9, wherein the dynamic virtual objects include at least one of dynamic meshes, animated meshes, or point clouds.

Clause 11: The method of any of clauses 1-10, further comprising: retrieving audio data for at least one of the number of dynamic virtual objects and presenting the retrieved audio data.

Clause 12: A device for processing extended reality (XR) data, the device comprising one or more means for performing the method of any of clauses 1-11.

Clause 13: The device of clause 12, wherein the one or more means comprise one or more processors implemented in circuitry.

Clause 14: The device of any of clauses 12 and 13, further comprising a display configured to display the XR data.

Clause 15: The device of any of clauses 12-14, wherein the device comprises one or more of a camera, a computer, a mobile device, a broadcast receiver device, or a set-top box.

Clause 16: The device of clause 12-15, further comprising a memory configured to store the XR data.

Clause 17: A computer-readable storage medium having stored thereon instructions that, when executed, cause a processor of a device for decoding video data to perform the method of any of clauses 1-11.

Clause 18: A device for processing extended reality (XR) data, the device comprising: means for parsing entry point data of a scene to extract information about one or more required virtual objects for an XR scene, the one or more required virtual objects including a number of dynamic objects virtual greater than one; means for initializing a number of streaming sessions equal to the number of dynamic virtual objects; means for retrieving media data for each of the number of dynamic virtual objects via one of the respective number of streaming sessions; and means for sending the retrieved media data to a rendering unit to render the XR scene to include the retrieved media data at corresponding locations within the XR scene.

Clause 19: A method of processing extended reality (XR) data, the method comprising: parsing entry point data of a scene to extract information about one or more required virtual objects for an XR scene, the one or more required virtual objects including a number of dynamic virtual objects greater than one; initializing a number of streaming sessions equal to the number of dynamic virtual objects using the entry point data, wherein initializing the number of streaming sessions includes initializing the streaming sessions in compliance with configured quality of service (QoS) and charging information for the streaming sessions; retrieving media data for each of the number of dynamic virtual objects via one of the respective number of streaming sessions; and sending the retrieved media data to a rendering unit to render the XR scene to include the retrieved media data at corresponding locations within the XR scene.

Clause 20: The method of clause 19, wherein configuring the QoS and charging information for the streaming sessions comprises, for each of the dynamic virtual objects: determining a type for the dynamic virtual object; and determining a QoS and charging information according to the type for the dynamic virtual object.

Clause 21: The method of clause 20, further comprising, for at least one of the dynamic virtual objects: determining whether the media data for the streaming session associated with the type for the at least one of the dynamic virtual objects is two-dimensional (2D) media data or three-dimensional (3D) media data; and determining the QoS and charging information according to whether the media data for the streaming session associated with the type for the at least one of the dynamic virtual objects is the 2D media data or the 3D media data.

Clause 22: The method of clause 19, wherein configuring the QoS and charging information for the streaming sessions comprises, for each of the dynamic virtual objects: determining an amount of bandwidth needed for media data associated with the streaming session for the dynamic virtual object; and configuring the QoS and charging information for the streaming session for the dynamic virtual object according to the amount of bandwidth needed.

Clause 23: The method of clause 19, wherein configuring the QoS and charging information for the streaming sessions comprises, for each of the dynamic virtual objects: determining that accurate user positioning information is needed for the streaming session for the dynamic virtual object; and configuring the QoS and charging information for the streaming session for the dynamic virtual object according to the determination that the accurate user positioning information is needed.

Clause 24: The method of clause 19, wherein configuring the QoS and charging information for the streaming sessions comprises: determining whether the rendering unit is configured to perform split rendering of the media data; when the rendering unit is not configured to perform split rendering, determining a first bitrate for the streaming sessions; and when the rendering unit is configured to perform split rendering, determining a second bitrate for the streaming sessions, the second bitrate being higher than the first bitrate.

Clause 25: The method of clause 19, further comprising: creating an XR session; and anchoring the XR scene to a real world space for the XR session.

Clause 26: The method of clause 19, wherein the required virtual objects further include one or more static virtual objects, the method further comprising retrieving media data for each of the one or more static virtual objects, and wherein rendering the XR scene further includes rendering the XR scene to include the retrieved media data for the one or more static virtual objects at corresponding locations within the XR scene.

Clause 27: The method of clause 19, wherein retrieving the media data for each of the number of dynamic virtual objects comprises: retrieving manifest files for each of the number of dynamic virtual objects; and retrieving media segments for each of the number of dynamic virtual objects using the respective manifest files.

Clause 28: The method of clause 27, wherein the manifest files comprise Media Presentation Descriptions (MPDs).

Clause 29: The method of clause 1, further comprising configuring immersive video decoders for each of the number of dynamic virtual objects.

Clause 30: The method of clause 1, further comprising: retrieving a list of available XR sessions, each of the available XR sessions having associated entry point data; receiving a selection of one of the available XR sessions; and retrieving a scene description for the selected one of the available XR sessions, the scene description including the entry point data associated with the selected one of the available XR sessions.

Clause 31: The method of clause 1, further comprising: retrieving a list of available XR sessions, each of the available XR sessions having associated entry point data; receiving a selection of one of the available XR sessions; requesting the entry point data associated with the one of the available XR sessions; receiving the requested entry point data and data representing requirements for optimal processing of a scene for the selected one of the available XR sessions; in response to determining that the requirements include Edge support, requesting data representing an Edge Application Server (AS) for the selected one of the available XR sessions; sending, to the Edge AS, initialization information for the selected one of the available XR sessions; and receiving, from the Edge AS, customized entry point data for the selected one of the available XR sessions.

Clause 32: The method of clause 1, wherein the entry point data includes a scene description including the information about the one or more required virtual objects for the XR scene.

Clause 33: The method of clause 1, wherein the dynamic virtual objects include at least one of dynamic meshes, animated meshes, or point clouds.

Clause 34: The method of clause 1, further comprising: retrieving audio data for at least one of the number of dynamic virtual objects and presenting the retrieved audio data.

Clause 35: A device for processing extended reality (XR) data, the device comprising: a memory configured to store XR data and media data; and one or more processors implemented in circuitry and configured to: parse entry point data of a scene to extract information about one or more required virtual objects for an XR scene, the one or more required virtual objects including a number of dynamic virtual objects greater than one; initialize a number of streaming sessions equal to the number of dynamic virtual objects using the entry point data, wherein to initialize the number of streaming sessions, the one or more processors are configured to initialize the streaming sessions in compliance with configured quality of service (QoS) and charging information for the streaming sessions; retrieve media data for each of the number of dynamic virtual objects via one of the respective number of streaming sessions; and send the retrieved media data to a rendering unit to render the XR scene to include the retrieved media data at corresponding locations within the XR scene.

Clause 36: The device of clause 35, wherein to configure the QoS and charging information for the streaming sessions, the one or more processors are configured to, for each of the dynamic virtual objects: determine a type for the dynamic virtual object; and determine a QoS and charging information according to the type for the dynamic virtual object.

Clause 37: The device of clause 35, wherein the one or more processors are further configured to: create an XR session; and anchor the XR scene to a real world space for the XR session.

Clause 38: The device of clause 35, wherein the required virtual objects further include one or more static virtual objects, and wherein the one or more processors are further configured to retrieve media data for each of the one or more static virtual objects, and wherein to render the XR scene, the one or more processors are further configured to render the XR scene to include the retrieved media data for the one or more static virtual objects at corresponding locations within the XR scene.

Clause 39: The device of clause 35, wherein to retrieve the media data for each of the number of dynamic virtual objects, the one or more processors are configured to: retrieve manifest files for each of the number of dynamic virtual objects; and retrieve media segments for each of the number of dynamic virtual objects using the respective manifest files.

Clause 40: The device of clause 35, wherein the one or more processors are further configured to: retrieve a list of available XR sessions, each of the available XR sessions having associated entry point data; receive a selection of one of the available XR sessions; and retrieve a scene description for the selected one of the available XR sessions, the scene description including the entry point data associated with the selected one of the available XR sessions.

Clause 41: The device of clause 35, wherein the one or more processors are further configured to: retrieve a list of available XR sessions, each of the available XR sessions having associated entry point data; receive a selection of one of the available XR sessions; request the entry point data associated with the one of the available XR sessions; receive the requested entry point data and data representing requirements for optimal processing of a scene for the selected one of the available XR sessions; in response to determining that the requirements include Edge support, request data representing an Edge Application Server (AS) for the selected one of the available XR sessions; send, to the Edge AS, initialization information for the selected one of the available XR sessions; and receive, from the Edge AS, customized entry point data for the selected one of the available XR sessions.

Clause 42: The device of clause 35, wherein the entry point data includes a scene description including the information about the one or more required virtual objects for the XR scene.

Clause 43: The device of clause 35, wherein the dynamic virtual objects include at least one of dynamic meshes, animated meshes, or point clouds.

Clause 44: The device of clause 35, further comprising a display configured to display the XR data.

Clause 45: The device of clause 35, wherein the device comprises one or more of a camera, a computer, a mobile device, a broadcast receiver device, or a set-top box.

Clause 46: A computer-readable storage medium having stored thereon instructions that, when executed, cause a processor to: parse entry point data of a scene to extract information about one or more required virtual objects for an XR scene, the one or more required virtual objects including a number of dynamic virtual objects greater than one; initialize a number of streaming sessions equal to the number of dynamic virtual objects using the entry point data, wherein the instructions that cause the processor to initialize the number of streaming sessions include instructions that cause the processor to initialize the streaming sessions in compliance with configured quality of service (QoS) and charging information for the streaming sessions; retrieve media data for each of the number of dynamic virtual objects via one of the respective number of streaming sessions; and send the retrieved media data to a rendering unit to render the XR scene to include the retrieved media data at corresponding locations within the XR scene.

Clause 47: A device for processing extended reality (XR) data, the device comprising: means for parsing entry point data of a scene to extract information about one or more required virtual objects for an XR scene, the one or more required virtual objects including a number of dynamic virtual objects greater than one; means for initializing a number of streaming sessions equal to the number of dynamic virtual objects, wherein the means for initializing the number of streaming sessions includes means for initializing the streaming sessions in compliance with configured quality of service (QoS) and charging information for the streaming sessions; means for retrieving media data for each of the number of dynamic virtual objects via one of the respective number of streaming sessions; and means for sending the retrieved media data to a rendering unit to render the XR scene to include the retrieved media data at corresponding locations within the XR scene.

Clause 48: A method of processing extended reality (XR) data, the method comprising: parsing entry point data of a scene to extract information about one or more required virtual objects for an XR scene, the one or more required virtual objects including a number of dynamic virtual objects greater than one; initializing a number of streaming sessions equal to the number of dynamic virtual objects using the entry point data, wherein initializing the number of streaming sessions includes initializing the streaming sessions in compliance with configured quality of service (QoS) and charging information for the streaming sessions; retrieving media data for each of the number of dynamic virtual objects via one of the respective number of streaming sessions; and sending the retrieved media data to a rendering unit to render the XR scene to include the retrieved media data at corresponding locations within the XR scene.

Clause 49: The method of clause 48, wherein configuring the QoS and charging information for the streaming sessions comprises, for each of the dynamic virtual objects: determining a type for the dynamic virtual object; and determining a QoS and charging information according to the type for the dynamic virtual object.

Clause 50: The method of clause 49, further comprising, for at least one of the dynamic virtual objects: determining whether the media data for the streaming session associated with the type for the at least one of the dynamic virtual objects is two-dimensional (2D) media data or three-dimensional (3D) media data; and determining the QoS and charging information according to whether the media data for the streaming session associated with the type for the at least one of the dynamic virtual objects is the 2D media data or the 3D media data.

Clause 51: The method of any of clauses 48-50, wherein configuring the QoS and charging information for the streaming sessions comprises, for each of the dynamic virtual objects: determining an amount of bandwidth needed for media data associated with the streaming session for the dynamic virtual object; and configuring the QoS and charging information for the streaming session for the dynamic virtual object according to the amount of bandwidth needed.

Clause 52: The method of any of clauses 48-51, wherein configuring the QoS and charging information for the streaming sessions comprises, for each of the dynamic virtual objects: determining that accurate user positioning information is needed for the streaming session for the dynamic virtual object; and configuring the QoS and charging information for the streaming session for the dynamic virtual object according to the determination that the accurate user positioning information is needed.

Clause 53: The method of any of clauses 48-52, wherein configuring the QoS and charging information for the streaming sessions comprises: determining whether the rendering unit is configured to perform split rendering of the media data; when the rendering unit is not configured to perform split rendering, determining a first bitrate for the streaming sessions; and when the rendering unit is configured to perform split rendering, determining a second bitrate for the streaming sessions, the second bitrate being higher than the first bitrate.

Clause 54: The method of any of clauses 48-53, further comprising: creating an XR session; and anchoring the XR scene to a real world space for the XR session.

Clause 55: The method of any of clauses 48-54, wherein the required virtual objects further include one or more static virtual objects, the method further comprising retrieving media data for each of the one or more static virtual objects, and wherein rendering the XR scene further includes rendering the XR scene to include the retrieved media data for the one or more static virtual objects at corresponding locations within the XR scene.

Clause 56: The method of any of clauses 48-55, wherein retrieving the media data for each of the number of dynamic virtual objects comprises: retrieving manifest files for each of the number of dynamic virtual objects; and retrieving media segments for each of the number of dynamic virtual objects using the respective manifest files.

Clause 57: The method of clause 56, wherein the manifest files comprise Media Presentation Descriptions (MPDs).

Clause 58: The method of any of clauses 48-57, further comprising configuring immersive video decoders for each of the number of dynamic virtual objects.

Clause 59: The method of any of clauses 48-58, further comprising: retrieving a list of available XR sessions, each of the available XR sessions having associated entry point data; receiving a selection of one of the available XR sessions; and retrieving a scene description for the selected one of the available XR sessions, the scene description including the entry point data associated with the selected one of the available XR sessions.

Clause 60: The method of any of clauses 48-59, further comprising: retrieving a list of available XR sessions, each of the available XR sessions having associated entry point data; receiving a selection of one of the available XR sessions; requesting the entry point data associated with the one of the available XR sessions; receiving the requested entry point data and data representing requirements for optimal processing of a scene for the selected one of the available XR sessions; in response to determining that the requirements include Edge support, requesting data representing an Edge Application Server (AS) for the selected one of the available XR sessions; sending, to the Edge AS, initialization information for the selected one of the available XR sessions; and receiving, from the Edge AS, customized entry point data for the selected one of the available XR sessions.

Clause 61: The method of 60, wherein the entry point data includes a scene description including the information about the one or more required virtual objects for the XR scene.

Clause 62: The method of any of clauses 48-61, wherein the dynamic virtual objects include at least one of dynamic meshes, animated meshes, or point clouds.

Clause 63: The method of any of clauses 48-62, further comprising: retrieving audio data for at least one of the number of dynamic virtual objects and presenting the retrieved audio data.

Clause 64: A device for processing extended reality (XR) data, the device comprising: a memory configured to store XR data and media data; and one or more processors implemented in circuitry and configured to: parse entry point data of a scene to extract information about one or more required virtual objects for an XR scene, the one or more required virtual objects including a number of dynamic virtual objects greater than one; initialize a number of streaming sessions equal to the number of dynamic virtual objects using the entry point data, wherein to initialize the number of streaming sessions, the one or more processors are configured to initialize the streaming sessions in compliance with configured quality of service (QoS) and charging information for the streaming sessions; retrieve media data for each of the number of dynamic virtual objects via one of the respective number of streaming sessions; and send the retrieved media data to a rendering unit to render the XR scene to include the retrieved media data at corresponding locations within the XR scene.

Clause 65: The device of clause 64, wherein to configure the QoS and charging information for the streaming sessions, the one or more processors are configured to, for each of the dynamic virtual objects: determine a type for the dynamic virtual object; and determine a QoS and charging information according to the type for the dynamic virtual object.

Clause 66: The device of any of clauses 64 and 65, wherein the one or more processors are further configured to: create an XR session; and anchor the XR scene to a real world space for the XR session.

Clause 67: The device of any of clauses 64-66, wherein the required virtual objects further include one or more static virtual objects, and wherein the one or more processors are further configured to retrieve media data for each of the one or more static virtual objects, and wherein to render the XR scene, the one or more processors are further configured to render the XR scene to include the retrieved media data for the one or more static virtual objects at corresponding locations within the XR scene.

Clause 68: The device of any of clauses 64-67, wherein to retrieve the media data for each of the number of dynamic virtual objects, the one or more processors are configured to: retrieve manifest files for each of the number of dynamic virtual objects; and retrieve media segments for each of the number of dynamic virtual objects using the respective manifest files.

Clause 69: The device of any of clauses 64-68, wherein the one or more processors are further configured to: retrieve a list of available XR sessions, each of the available XR sessions having associated entry point data; receive a selection of one of the available XR sessions; and retrieve a scene description for the selected one of the available XR sessions, the scene description including the entry point data associated with the selected one of the available XR sessions.

Clause 70: The device of any of clauses 64-69, wherein the one or more processors are further configured to: retrieve a list of available XR sessions, each of the available XR sessions having associated entry point data; receive a selection of one of the available XR sessions; request the entry point data associated with the one of the available XR sessions; receive the requested entry point data and data representing requirements for optimal processing of a scene for the selected one of the available XR sessions; in response to determining that the requirements include Edge support, request data representing an Edge Application Server (AS) for the selected one of the available XR sessions; send, to the Edge AS, initialization information for the selected one of the available XR sessions; and receive, from the Edge AS, customized entry point data for the selected one of the available XR sessions.

Clause 71: The device of any of clauses 64-70, wherein the entry point data includes a scene description including the information about the one or more required virtual objects for the XR scene.

Clause 72: The device of any of clauses 64-71, wherein the dynamic virtual objects include at least one of dynamic meshes, animated meshes, or point clouds.

Clause 73: The device of any of clauses 64-72, further comprising a display configured to display the XR data.

Clause 74: The device of any of clauses 64-73, wherein the device comprises one or more of a camera, a computer, a mobile device, a broadcast receiver device, or a set-top box.

Clause 75: A computer-readable storage medium having stored thereon instructions that, when executed, cause a processor to: parse entry point data of a scene to extract information about one or more required virtual objects for an XR scene, the one or more required virtual objects including a number of dynamic virtual objects greater than one; initialize a number of streaming sessions equal to the number of dynamic virtual objects using the entry point data, wherein the instructions that cause the processor to initialize the number of streaming sessions include instructions that cause the processor to initialize the streaming sessions in compliance with configured quality of service (QoS) and charging information for the streaming sessions; retrieve media data for each of the number of dynamic virtual objects via one of the respective number of streaming sessions; and send the retrieved media data to a rendering unit to render the XR scene to include the retrieved media data at corresponding locations within the XR scene.

Clause 76: A device for processing extended reality (XR) data, the device comprising: means for parsing entry point data of a scene to extract information about one or more required virtual objects for an XR scene, the one or more required virtual objects including a number of dynamic virtual objects greater than one; means for initializing a number of streaming sessions equal to the number of dynamic virtual objects, wherein the means for initializing the number of streaming sessions includes means for initializing the streaming sessions in compliance with configured quality of service (QoS) and charging information for the streaming sessions; means for retrieving media data for each of the number of dynamic virtual objects via one of the respective number of streaming sessions; and means for sending the retrieved media data to a rendering unit to render the XR scene to include the retrieved media data at corresponding locations within the XR scene.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing extended reality (XR) data, the method comprising:
    parsing entry point data of an XR scene to extract information about one or more required virtual objects for the XR scene, the one or more required virtual objects including a number of dynamic virtual objects equal to or greater than one, each of the dynamic virtual objects including at least one dynamic media component for which media data is to be retrieved;
    initializing a number of streaming sessions equal to or greater than the number of dynamic virtual objects using the entry point data, wherein initializing the streaming sessions includes initializing the streaming sessions in compliance with configured quality of service (QoS) and charging information for the streaming sessions;
    retrieving media data for each of the dynamic media components of the dynamic virtual objects via one of the respective number of streaming sessions; and
    sending the retrieved media data to a rendering unit to render the XR scene to include the retrieved media data at corresponding locations within the XR scene.

2. The method of claim 1, wherein configuring the QoS and charging information for the streaming sessions comprises, for each of the dynamic virtual objects:
    determining a type for the dynamic virtual object; and
    determining a QoS and charging information according to the type for the dynamic virtual object.

3. The method of claim 2, further comprising, for at least one of the dynamic virtual objects:
    determining whether the media data for the streaming session associated with the type for the at least one of the dynamic virtual objects is two-dimensional (2D) media data or three-dimensional (3D) media data; and
    determining the QoS and charging information according to whether the media data for the streaming session associated with the type for the at least one of the dynamic virtual objects is the 2D media data or the 3D media data.

4. The method of claim 1, wherein configuring the QoS and charging information for the streaming sessions comprises, for each of the dynamic virtual objects:
    determining an amount of bandwidth needed for media data associated with the streaming session for the dynamic virtual object; and
    configuring the QoS and charging information for the streaming session for the dynamic virtual object according to the amount of bandwidth needed.

5. The method of claim 1, wherein configuring the QoS and charging information for the streaming sessions comprises, for each of the dynamic virtual objects:
    determining that accurate user positioning information is needed for the streaming session for the dynamic virtual object; and
    configuring the QoS and charging information for the streaming session for the dynamic virtual object according to the determination that the accurate user positioning information is needed.

6. The method of claim 1, wherein configuring the QoS and charging information for the streaming sessions comprises:

determining whether the rendering unit is configured to perform split rendering of the media data;
when the rendering unit is not configured to perform split rendering, determining a first minimum bitrate for the streaming sessions; and
when the rendering unit is configured to perform split rendering, determining a second minimum bitrate for the streaming sessions, the second bitrate being higher than the first bitrate.

7. The method of claim 1, further comprising:
creating an XR session; and
anchoring the XR scene to a real world space for the XR session.

8. The method of claim 1, wherein the required virtual objects further include one or more static virtual objects, the method further comprising retrieving media data for each of the one or more static virtual objects, and wherein rendering the XR scene further includes rendering the XR scene to include the retrieved media data for the one or more static virtual objects at corresponding locations within the XR scene.

9. The method of claim 1, wherein retrieving the media data for each of the number of dynamic virtual objects comprises:
retrieving manifest files for each of the number of dynamic virtual objects; and
retrieving media segments for each of the number of dynamic virtual objects using the respective manifest files.

10. The method of claim 9, wherein the manifest files comprise Media Presentation Descriptions (MPDs).

11. The method of claim 1, further comprising configuring immersive video decoders for each of the number of dynamic virtual objects.

12. The method of claim 1, further comprising:
retrieving a list of available XR sessions, each of the available XR sessions having associated entry point data;
receiving a selection of one of the available XR sessions; and
retrieving a scene description for the selected one of the available XR sessions, the scene description including the entry point data associated with the selected one of the available XR sessions.

13. The method of claim 1, further comprising:
retrieving a list of available XR sessions, each of the available XR sessions having associated entry point data;
receiving a selection of one of the available XR sessions;
requesting the entry point data associated with the one of the available XR sessions;
receiving the requested entry point data and data representing requirements for optimal processing of a scene for the selected one of the available XR sessions;
in response to determining that the requirements include Edge support, requesting data representing an Edge Application Server (AS) for the selected one of the available XR sessions;
sending, to the Edge AS, initialization information for the selected one of the available XR sessions; and
receiving, from the Edge AS, customized entry point data for the selected one of the available XR sessions.

14. The method of claim 1, wherein the entry point data includes a scene description including the information about the one or more required virtual objects for the XR scene.

15. The method of claim 1, wherein the dynamic virtual objects include at least one of dynamic meshes, animated meshes, or point clouds.

16. The method of claim 1, further comprising: retrieving audio data for at least one of the number of dynamic virtual objects and presenting the retrieved audio data.

17. A device for processing extended reality (XR) data, the device comprising:
a memory configured to store XR data and media data; and
one or more processors implemented in circuitry and configured to:
parse entry point data of an XR scene to extract information about one or more required virtual objects for the XR scene, the one or more required virtual objects including a number of dynamic virtual objects equal to or greater than one, each of the dynamic virtual objects including at least one dynamic media component for which media data is to be retrieved;
initialize a number of streaming sessions equal to or greater than the number of dynamic virtual objects using the entry point data, wherein to initialize the streaming sessions, the one or more processors are configured to the initialize streaming sessions in compliance with configured quality of service (QoS) and charging information for the streaming sessions;
retrieve media data for each of the dynamic media components of the dynamic virtual objects via one of the respective number of streaming sessions; and
send the retrieved media data to a rendering unit to render the XR scene to include the retrieved media data at corresponding locations within the XR scene.

18. The device of claim 17, wherein to configure the QoS and charging information for the streaming sessions, the one or more processors are configured to, for each of the dynamic virtual objects:
determine a type for the dynamic virtual object; and
determine a QoS and charging information according to the type for the dynamic virtual object.

19. The device of claim 17, wherein the one or more processors are further configured to:
create an XR session; and
anchor the XR scene to a real world space for the XR session.

20. The device of claim 17, wherein the required virtual objects further include one or more static virtual objects, and wherein the one or more processors are further configured to retrieve media data for each of the one or more static virtual objects, and wherein to render the XR scene, the one or more processors are further configured to render the XR scene to include the retrieved media data for the one or more static virtual objects at corresponding locations within the XR scene.

21. The device of claim 17, wherein to retrieve the media data for each of the number of dynamic virtual objects, the one or more processors are configured to:
retrieve manifest files for each of the number of dynamic virtual objects; and
retrieve media segments for each of the number of dynamic virtual objects using the respective manifest files.

22. The device of claim 17, wherein the one or more processors are further configured to:
retrieve a list of available XR sessions, each of the available XR sessions having associated entry point data;

receive a selection of one of the available XR sessions; and retrieve a scene description for the selected one of the available XR sessions, the scene description including the entry point data associated with the selected one of the available XR sessions.

23. The device of claim 17, wherein the one or more processors are further configured to:

retrieve a list of available XR sessions, each of the available XR sessions having associated entry point data;

receive a selection of one of the available XR sessions;

request the entry point data associated with the one of the available XR sessions;

receive the requested entry point data and data representing requirements for optimal processing of a scene for the selected one of the available XR sessions;

in response to determining that the requirements include Edge support, request data representing an Edge Application Server (AS) for the selected one of the available XR sessions;

send, to the Edge AS, initialization information for the selected one of the available XR sessions; and receive, from the Edge AS, customized entry point data for the selected one of the available XR sessions.

24. The device of claim 17, wherein the entry point data includes a scene description including the information about the one or more required virtual objects for the XR scene.

25. The device of claim 17, wherein the dynamic virtual objects include at least one of dynamic meshes, animated meshes, or point clouds.

26. The device of claim 17, further comprising a display configured to display the XR data.

27. The device of claim 17, wherein the device comprises one or more of a camera, a computer, a mobile device, a broadcast receiver device, or a set-top box.

28. A computer-readable storage medium having stored thereon instructions that, when executed, cause a processor to:

parse entry point data of an XR scene to extract information about one or more required virtual objects for the XR scene, the one or more required virtual objects including a number of dynamic virtual objects equal to or greater than one, each of the dynamic virtual objects including at least one dynamic media component for which media data is to be retrieved;

initialize a number of streaming sessions equal to or greater than the number of dynamic virtual objects using the entry point data, wherein the instructions that cause the processor to initialize the number of streaming sessions include instructions that cause the processor to initialize the streaming sessions in compliance with configured quality of service (QoS) and charging information for the streaming sessions;

retrieve media data for each of the dynamic media components of the dynamic virtual objects via one of the respective number of streaming sessions; and send the retrieved media data to a rendering unit to render the XR scene to include the retrieved media data at corresponding locations within the XR scene.

29. A device for processing extended reality (XR) data, the device comprising:

means for parsing entry point data of an XR scene to extract information about one or more required virtual objects for the XR scene, the one or more required virtual objects including a number of dynamic virtual objects equal to or greater than one, each of the dynamic virtual objects including at least one dynamic media component for which media data is to be retrieved;

means for initializing a number of streaming sessions equal to or greater than the number of dynamic virtual objects, wherein the means for initializing the number of streaming sessions includes means for initializing the streaming sessions in compliance with configured quality of service (QoS) and charging information for the streaming sessions;

means for retrieving media data for each of the number of dynamic virtual objects via one of the respective number of streaming sessions; and means for sending the retrieved media data to a rendering unit to render the XR scene to include the retrieved media data at corresponding locations within the XR scene.

* * * * *